US 011789154B2

(12) United States Patent
Koonath et al.

(10) Patent No.: US 11,789,154 B2
(45) Date of Patent: Oct. 17, 2023

(54) WALK-OFF COMPENSATION IN REMOTE IMAGING SYSTEMS

(71) Applicant: SiLC Technologies, Inc., Monrovia, CA (US)

(72) Inventors: Prakash Koonath, La Crescenta, CA (US); Shuren Hu, Arcadia, CA (US); Mehdi Asghari, La Canada Flintridge, CA (US); Bradley Jonathan Luff, La Canada Flintridge, CA (US); Behnam Behroozpour, South San Francisco, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 701 days.

(21) Appl. No.: 16/931,444

(22) Filed: Jul. 17, 2020

(65) Prior Publication Data

US 2022/0018963 A1      Jan. 20, 2022

(51) Int. Cl.
 *G01S 17/89*    (2020.01)
 *G01S 17/26*    (2020.01)
 *G01S 7/481*    (2006.01)

(52) U.S. Cl.
 CPC ............ *G01S 17/89* (2013.01); *G01S 7/4811* (2013.01); *G01S 7/4817* (2013.01); *G01S 17/26* (2020.01)

(58) Field of Classification Search
 CPC ........ G01S 17/89; G01S 17/26; G01S 7/4811; G01S 7/4817
 See application file for complete search history.

(56) References Cited

U.S. PATENT DOCUMENTS

| | | | |
|---|---|---|---|
| 11,579,300 B1* | 2/2023 | Li | ...................... G01S 7/4817 |
| 2019/0257924 A1 | 8/2019 | Li et al. | |
| 2019/0391243 A1 | 12/2019 | Nicolaescu | |
| 2020/0142068 A1* | 5/2020 | Crouch | ................ G01S 7/4817 |
| 2020/0166617 A1* | 5/2020 | Crouch | ................ G01S 17/931 |
| 2020/0333533 A1* | 10/2020 | Rogers | ................... G01S 17/32 |

(Continued)

OTHER PUBLICATIONS

Carter, Jamie et al., "Lidar 101: An Introduction to Lidar Technology, Data, and Applications", Nov. 2012, NOAA Coastal Services Center (Year: 2012).*

(Continued)

*Primary Examiner* — Yuqing Xiao
*Assistant Examiner* — Brian Zawacki
(74) *Attorney, Agent, or Firm* — Gavrilovich, Dodd & Lindsey LLP

(57) ABSTRACT

Systems and methods described herein are directed to high speed remote imaging systems, such as Light Detection and Ranging (LIDAR) systems. Example embodiments describe systems that are configured to mitigate a walk-off effect that may limit a speed of operation of the imaging system. The walk-off effect may be characterized by a failure to steer returning signals to a designated input facet of the imaging system due to continuous rotation of mirrors associated with the steering mechanisms. The walk-off effect may be mitigating by configuring more than one input waveguide to receiving returning signals associated with an output signal. The input waveguides may be spaced apart and configured to sequentially receive the input signals. In some embodiments, walk-off mitigation may extend a range of operation of the imaging systems.

18 Claims, 14 Drawing Sheets

(56) References Cited

U.S. PATENT DOCUMENTS

2021/0063542 A1* 3/2021 Zheng .............. G02B 27/0955
2021/0165102 A1   6/2021 Crouch et al.
2021/0349196 A1* 11/2021 Wang .................... G01S 7/484

OTHER PUBLICATIONS

Thomas, Shane, International Search Report and Written Opinion, PCT/US2021/042109, International Searching Authority, United States Patent and Trademark Office, dated Mar. 25, 2022.

* cited by examiner

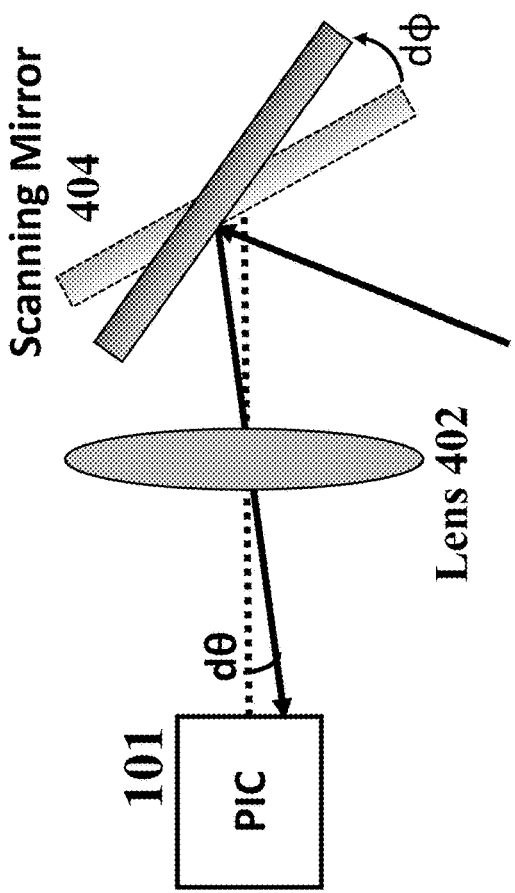
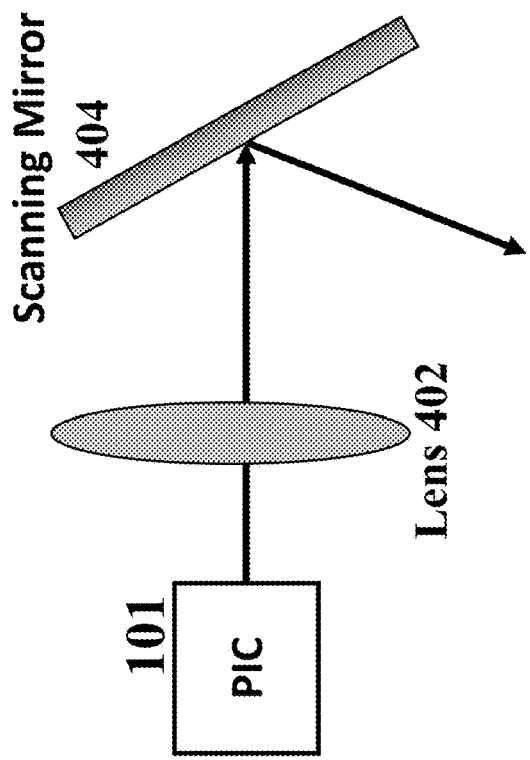
Figure 4B
Figure 4A

WALK-OFF COMPENSATION IN REMOTE IMAGING SYSTEMS

FIELD

The invention relates to remote imaging systems. In particular, the invention relates to frequency modulated continuous wave (FMCW) based LIDAR (Light Detection and Ranging) systems.

BACKGROUND

Remote imaging systems that can direct light beams over a targeted field-of-view (FOV) and collect the reflected light beams with minimal loss of photons are necessary for implementing high performance remote imaging. Various applications (e.g., robotics, machine vision, autonomous systems, and unmanned aerial vehicles) are relying on such remote imaging systems to scan and analyze the surrounding environments. Such an imaging system may generally include an imaging device with a single input facet for collecting the reflected light beams and a scanning module that is configured for directing the reflected light beams onto the single input facet. The scanning module may include a first mirror that rotates about a first axis ("fast axis") at a relatively high speed and a second mirror that rotates about a second axis ("slow axis") at a relatively lower speed. A combined operation of the first mirror and the second mirror of the scanning module may then scan the light beams across the FOV and return the reflected light beams back to the input facet of the imaging system. Increasing the fast axis and/or the slow axis speed may cause the reflected light beams to be incident away from the input facet of the imaging system, thereby causing loss of photons and limiting the ability of the imaging system to operate at the increased scanning speeds. This may hamper the ability of the system to perform image collection at fast frame rates and/or limit an angular resolution of the system. This phenomenon, in which a reflected light beam from the same FOV as an incident light beam, is directed away from the input facet of the imaging device, may be referred to as "walk-off." The loss of photons associated with the reflected light beams due to the walk-off effect currently limits the scan speeds of most imaging systems.

As such, the ability of imaging systems to mitigate walk-off is becoming increasingly important to efficiently collect reflected and/or scattered photons associated with scans of targeted regions at high speeds and generate three-dimensional image constructions of the scanned regions. For example, advanced driver assistance systems (ADAS) that rely on LIDAR (Light Detection and Ranging) systems can significantly improve real-time processing speeds of surrounding environments if the LIDAR systems do not suffer from walk-off. Moreover, as round-trip delay time between a transmitted light signal and its corresponding reflected light beam increases (e.g., for long range operation), walk-off due to the fast-axis and/or slow-axis mirror speed increases, thereby greatly limiting a range of operation of the imaging system. As such, there exists a significant need for imaging systems that mitigate the walk-off effect.

SUMMARY

This summary is not intended to identify critical or essential features of the disclosures herein, but instead merely summarizes certain features and variations thereof. Other details and features will also be described in the sections that follow.

Some of the features described herein relate to a system and device for mitigating the walk-off effect. In some embodiments, the imaging device (e.g., LIDAR chip) may include a single output waveguide and a plurality of input waveguides. The single output waveguide may be configured to carry an output imaging signal and the plurality of input waveguides may be configured to couple reflected imaging signals into the imaging device. The plurality of input waveguides may be spaced apart based on various parameters such as a FOV, fast-axis speed, slow-axis speed, range of operation, wavelength of operation, chirp bandwidth, chirp frequencies, and/or chirp duration. The spacing between the input waveguides may further be based on optics (e.g., collimators, lenses, etc.) used in the imaging system (e.g., LIDAR system) and/or a waveguide coupling coefficient. In some embodiments, the system may determine a walk-off mitigation parameter based on the various parameters described above and/or configurations of the imaging device.

In some embodiments, the imaging device with the plurality of input waveguides may be configured to continue receiving returning photons associated with a given imaging FOV as the scanning mirror(s) continue to rotate about the fast and slow axis. For example, a first input waveguide of the plurality of input waveguides may receive returning photons from objects closest to the imaging system while a second input waveguide of the plurality of input waveguides may receive returning photons from objects located slightly further away. A third input waveguide of the plurality of input waveguides may then receive returning photons from objects located furthest away from the imaging system for a given maximum range of operation of the system. As such, the imaging system can be configured to minimize loss of returning signals based on maximizing the capture of the returning photons for different orientations of the scanning mirror(s). This can enable the imaging system to scan a target region at higher imaging speeds without degradation of the imaging quality.

In some embodiments, by varying the spacings between each pair of the plurality of input waveguides, a range of operation of the imaging system may be extended. For example, by maximizing returning photon capture for different operating ranges, the imaging system may be able to detect objects located at a short range and a medium range of operation simultaneously. In some instances, a range of operation of the imaging system may be extended while maintaining the same scanning speeds. This can enable the development of high-performance imaging systems without increasing costs.

BRIEF DESCRIPTION OF THE DRAWINGS

Some features herein are illustrated by way of example, and not by way of limitation, in the figures of the accompanying drawings and in which like reference numerals refer to similar elements.

FIGS. 4A-B show an example illustration of the walk-off effect in accordance with various embodiments described herein.

DETAILED DESCRIPTION

Figure 1:
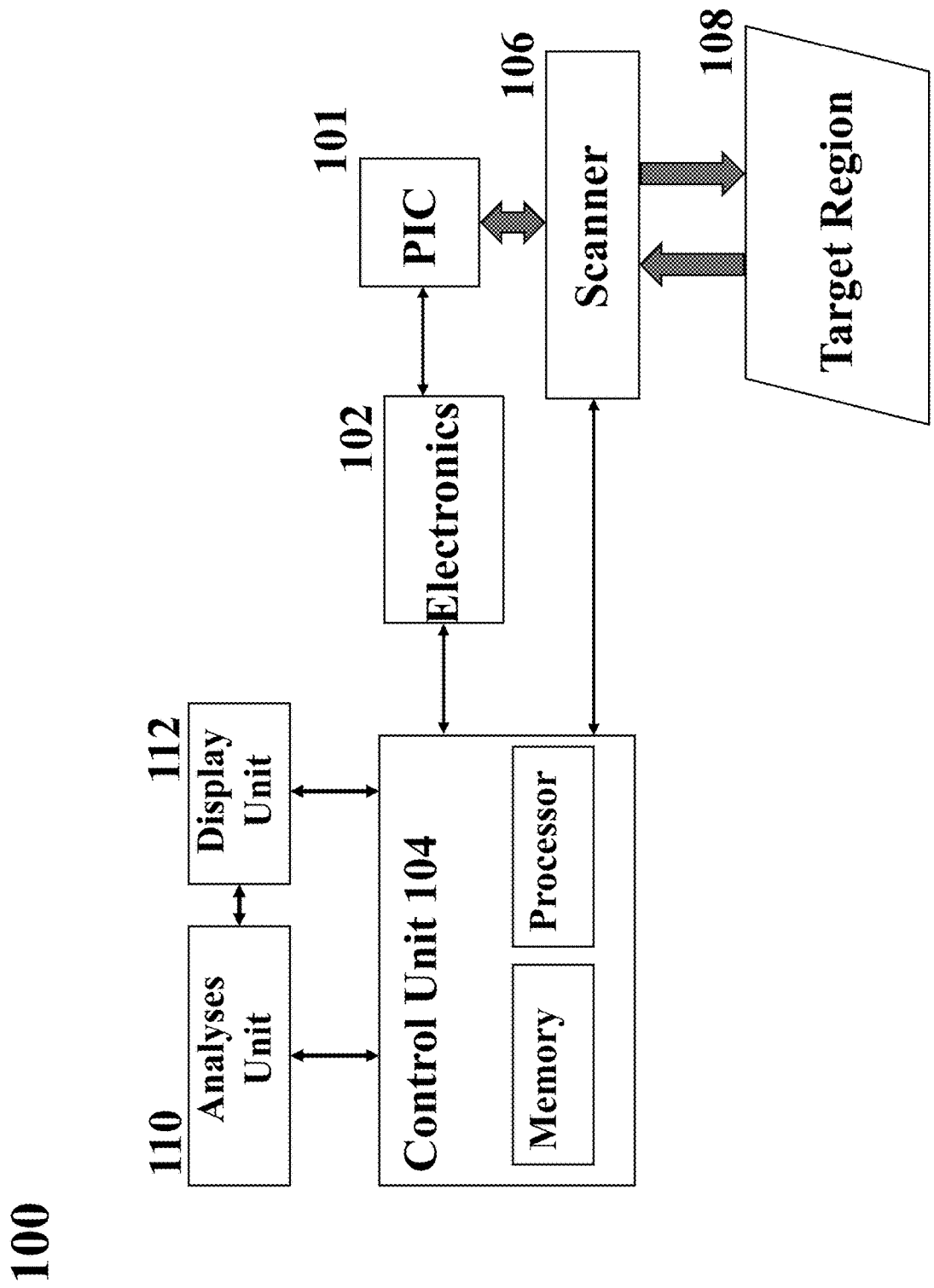
FIG. 1 shows the remote imaging system in accordance with various embodiments described herein.

Example embodiments will now be described more fully with reference to the accompanying drawings. Many alternate forms may be embodied, and example embodiments should not be construed as limited to example embodiments set forth herein. In the drawings, like reference numerals refer to like elements.

It will be understood that, although the terms first, second, etc. may be used herein to describe various elements, these elements should not be limited by these terms. As used herein, the term "and/or" includes any and all combinations of one or more of the associated items. Unless specifically stated otherwise, or as is apparent from the discussion, terms such as "processing" or "computing" or "calculating" or "determining" or "displaying" or the like, refer to the action and processes of a computing system, or similar electronic computing device, that manipulates, and transforms data represented as physical, electronic quantities within the computing system's registers and memories into other data similarly represented as physical quantities within the computing system's memories or registers or other such information storage, transmission or display devices.

In the following description, illustrative embodiments will be described with reference to symbolic representations of operations (e.g., in the form of flow charts, flow diagrams, data flow diagrams, structure diagrams, block diagrams, etc.) that may be implemented as program modules or functional processes including routines, programs, objects, components, data structures, etc. that perform particular tasks or implement particular abstract data types and may be implemented using hardware in electronic systems (e.g., an imaging and display device). Such existing hardware may include one or more digital signal processors (DSPs), application-specific integrated circuits (ASICs), field programmable gate arrays (FPGAs), central processing units (CPUs), or the like.

As disclosed herein, the term "storage medium," "computer readable storage medium" or "non-transitory computer readable storage medium" may represent one or more devices for storing data, including read only memory (ROM), random access memory (RAM), magnetic RAM, magnetic disk storage memory, optical storage mediums, flash memory devices and/or other tangible machine readable mediums for storing information. The term "computer-readable memory" may include, but is not limited to, portable or fixed storage devices, optical storage devices, and various other mediums capable of storing, containing or carrying instructions and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. When implemented in software, a processor(s) may be programmed to perform the necessary tasks, thereby being transformed into special purpose processor(s) or computer(s).

FIG. 1 shows a schematic illustration of a remote imaging system 100. The imaging system may include an imaging device 101 that can comprise a photonic integrated circuit (PIC) for generating, transmitting, and/or receiving light signals. The imaging system can further include a mechanism for steering the light signals 106 (e.g., scanning module, micro-electro-mechanical mirrors, arrayed waveguide gratings, optical phased arrays, etc.), a control unit 104, an analysis unit 110, at least one display unit 112, interface electronics 102, optics (e.g., collimators, lenses, etc.), and various other processing elements (e.g., DSPs, ASICs, CPUs, FPGAs, circuits, memory, etc.). In some embodiments, the imaging system may include one or more communication interfaces such as graphical user interfaces (GUIs).

The PIC 101 may interface with the interface electronics 102 and the control unit 104. The control unit 104 can include memory, such as the non-transitory computer readable storage medium described above, in communication with various processing elements (e.g., electrical circuits, microprocessors, DSPs, ASICs, FPGAs, CPUs). Although the electronics are illustrated as a single component in a single location, the electronics may include multiple different components that are independent of one another and/or placed in different locations. Additionally, as noted above, all or a portion of the disclosed electronics may be included on the chip including electronics that may be integrated with the chip. The electronics may comprise a part of the LIDAR system.

The imaging system 100 may be configured to scan a target region 108 based on controlling one or more photonic components of the PIC 101 and/or the scanning module 106. For example, the imaging system 100 may generate an output imaging signal that is configured to scan the target region 108 over a FOV of approximately 10 to 180 degrees and at approximate scan speeds of 50 Hz up to several kHz for the fast axis and a few Hz to tens of Hz for the slow axis.

In some embodiments, the imaging system may include a Frequency Modulated Continuous Wave (FMCW) LIDAR system and the PIC may comprise a LIDAR chip with a plurality of photonic components including an on-chip laser. The LIDAR system may generate an output light signal such as a LIDAR output signal that is frequency modulated over different chirp durations. For example, the frequency of the LIDAR output signal may linearly increase over a first chirp duration, ($t_1$) and linearly decrease over a second chirp duration ($t_2$). This may vary a wavelength of the LIDAR output signal over the different chirp durations. For example, the wavelength of the LIDAR output signal may vary between 1200 nm to 1320 nm, 1400 nm to 1590 nm, and 1900 to 2100 nm depending upon the wavelength range of operation of the on-chip laser. In some embodiments, one or more light sources (e.g., laser) may be configured to generate the LIDAR output signal with a wavelength centered around approximately 1550 nm. The first chirp duration with the linearly increasing outgoing LIDAR signal frequency may be referred to as an up-ramp chirp and the second chirp duration with the linearly decreasing outgoing LIDAR signal frequency may be referred to as a down-ramp chirp. The LIDAR system may be configured to estimate a target range and/or velocity based on at least one chirp duration.

The control unit 104 may be configured to cause the scanning module 106 to control the scanning of different target regions based on steering the outgoing LIDAR signal. The target regions can each be associated with at least one data cycle and/or each data cycle can be associated with one of the target regions. As a result, each LIDAR data result can be associated with one of the target regions. Different target regions may have some overlap or be distinct from one another. For data cycles that include two chirp durations, each data point for a target region may be associated with two chirp durations. For data cycles that include three chirp durations, each data point for a target region may be associated with three chirp durations.

Figure 2:
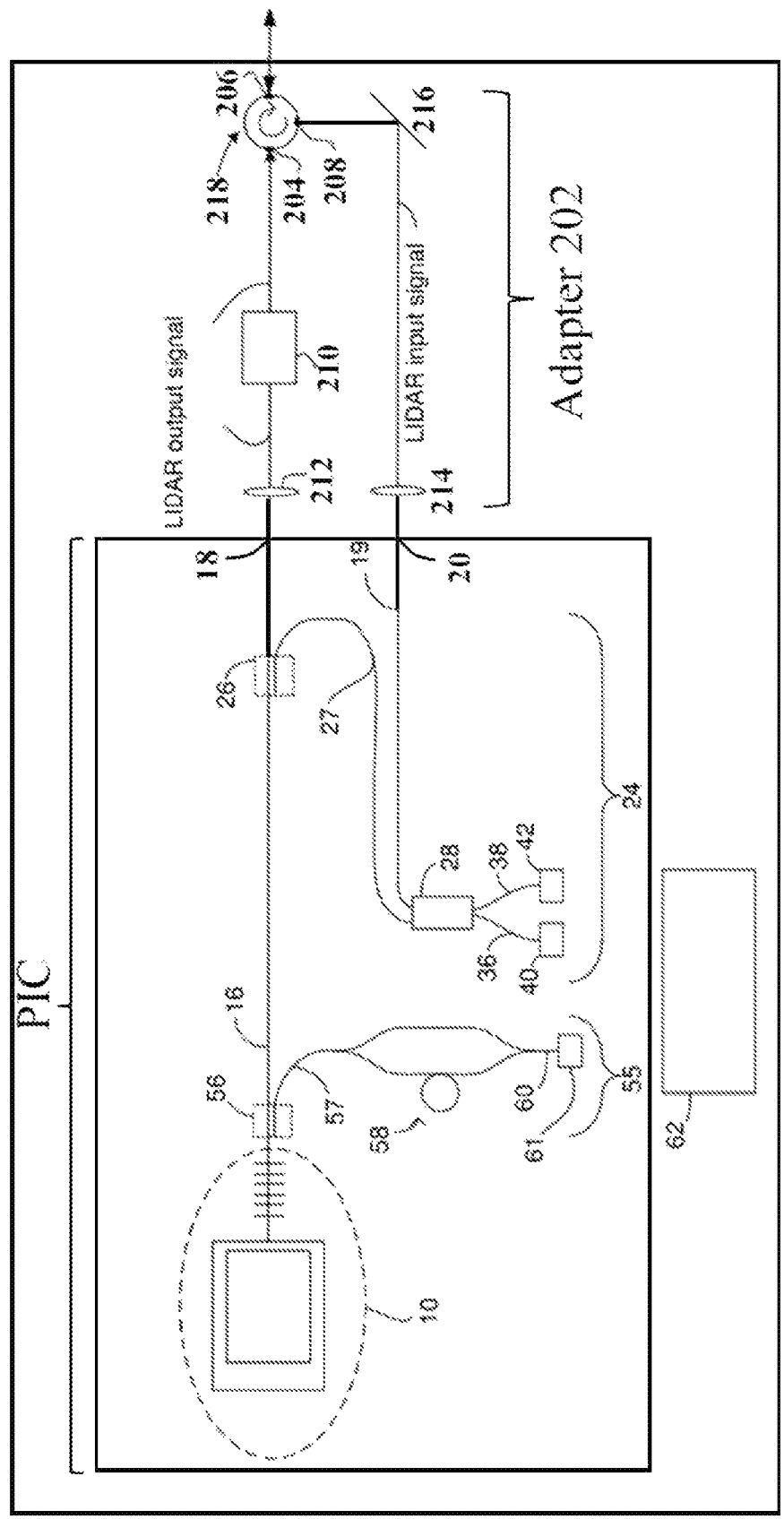
FIG. 2 shows an example illustration of a remote imaging device.

FIG. 2 shows a top view of a LIDAR chip that includes a light source 10 (e.g., laser) and a plurality of photonic components such as an output waveguide 16, an input waveguide 19, a reference waveguide 27, light-combining component 28, splitters 56 and 26, and an interferometer 58. In some instances, the LIDAR chip may interface with an adapter 202 that includes collimating and/or focusing optics for directing the LIDAR output signal and the LIDAR input signal onto the corresponding waveguide facets of the LIDAR chips. The output of the light source 10 may be coupled into the output waveguide 16 that terminates at a facet 18 of the LIDAR chip. The waveguide 16 may transmit the coupled light output from the light source to the chip facet 18. Accordingly, the waveguide 16 may terminate at the facet 18. The light output transmitted from the facet 18 can serve as the outgoing LIDAR signal emitted from the LIDAR chip as described with respect to FIG. 1. For example, the facet 18 may be positioned at an edge of the LIDAR chip so the LIDAR output signal traveling through the facet 18 exits the chip and serves as an output signal from the LIDAR. The facet 18 may be referred to as a terminating facet associated with the waveguide 16. The LIDAR chip of FIG. 2 may be associated with LIDAR chips described in related applications bearing U.S. application Ser. Nos. 16/547,522 and 16/726,235, disclosed herein in their entirety.

In some embodiments, the LIDAR chip may include an amplifier positioned along the output path of the LIDAR output signal and before the facet 18. For example, the output waveguide 16 may carry the LIDAR output signal to the amplifier and an amplified LIDAR output signal may then exit the LIDAR chip from the facet 18. The electronics 102 may be configured to control the amplifier operation and/or control a power of the LIDAR output signal. Examples of amplifiers include, but are not limited to, Erbium-doped fiber amplifiers (EDFAs), Erbium-doped waveguide amplifiers (EDWAs), and Semiconductor Optical Amplifiers (SOAs). In some embodiments, the amplifier may be a discrete component that is attached to the chip. The discrete amplifier may be positioned at any location on the LIDAR chip along the path of the LIDAR output signal. In some embodiments, all or a portion of the amplifier may be fabricated as along with the LIDAR chip as an integrated on-chip component. The LIDAR chip may be fabricated from various substrate materials including, but not limited to, silicon dioxide, indium phosphide, and silicon-on-insulator (SOI) wafers. Examples of splitters 56 and 26 include, but are not limited to, y-junctions, optical couplers, and MMIs.

In some embodiments, a LIDAR adapter may be positioned between the LIDAR chip, also referred to as the PIC interchangeably throughout this specification, and the scanning module 106. The LIDAR adapter may include optics, such as lenses 212 and 214, a circulator 218, mirror(s) 216 and an amplifier 210. The LIDAR output signal may then exit the LIDAR chip through the facet 18 and enter the circulator 218 through port 204 after passing through the lens 212. The circulator 218 may then direct the LIDAR output signal to the scanning module 106 via a port 206 of the circulator. In some instances, if no amplifier is present along the output waveguide 16, the amplifier 210 may be positioned in the path of the LIDAR output signal and between the lens 212 and the circulator 218 for amplifying the LIDAR output signal. The lens 212 may then focus the LIDAR output signal onto an entry port of the amplifier 210. In some instances, the components of the LIDAR adapter may be positioned on a support base.

The scanning module 106 may then direct the LIDAR output signal towards a targeted FOV and direct the returning LIDAR signals associated with the LIDAR output signal back to the circulator port 206. Accordingly, the port 206 of the circulator 218 may be configured to output LIDAR signals and receive LIDAR input signals simultaneously. In some instances, the port 206 of the circulator 218 may be connected to a fiber (e.g., polarization maintaining optical fiber) that outputs and/or receives LIDAR signals via a collimator positioned between the LIDAR adapter and the scanning module 106.

The returning LIDAR signals may be associated with reflection(s) of the LIDAR output signal off one or more objects located in the targeted FOV. The returning LIDAR signals may be redirected by the scanning module 106 to the collimator that may focus the signals onto the port 206 of the circulator 218. The circulator 218 can be configured to direct the returning LIDAR signals, as LIDAR input signals to lens 214 via port 208. The lens 214 may then focus the LIDAR input signals onto a facet 20 of an input waveguide 19 of the LIDAR chip. In some instances, the adapter 202 may include one or more mirrors, such as mirror 216, for changing a respective direction of the LIDAR signals. For example, the adapter 202 may include the mirror 216 mirror as a direction-changing component that redirects the LIDAR input signal from the port 208 of the circulator 218 to the facet 20 of the input waveguide 19.

A first LIDAR input signal that enters the input waveguide 19 may be associated with a first object located closest to the LIDAR chip while a second LIDAR input signal that enters the input waveguide 19 after some short delay may be associated with a second object located further away from the LIDAR chip. The arrival delay between the first LIDAR input signal and the second LIDAR input signal may be proportional to a line-of-sight distance between the first object and the second object relative to a location of the LIDAR chip.

In some instances, the LIDAR adapter may include waveguides for guiding the LIDAR signals. In some other instances, the optical path that the LIDAR input signals and the LIDAR output signal travel between components on the LIDAR adapter and/or between the LIDAR chip and a component on the LIDAR adapter can be free space The input waveguide 19 may transmit the first LIDAR input signal to a light-combining component 28 (e.g., multimode interference device (MIMI), adiabatic splitter, and/or directional coupler) that may be a part of a data branch 24 of the LIDAR chip. In some embodiments, the light-combining component 28 may be an MMI device such as a 2×2 MMI device. The functions of the illustrated light-combining component 28 can be performed by more than one optical component.

The data branch 24 may include photonic components that guide and/or modify the optical LIDAR signals for the LIDAR chip. The photonic components of the data branch may include a splitter 26, a reference waveguide 27, the light-combining component 28, a first detector waveguide 36, a second detector waveguide 38, a first light sensor 40, and a second light sensor 42.

The splitter 26 may transmit a portion of the outgoing LIDAR signal from the utility waveguide 16 into the reference waveguide 27. The illustrated splitter 26 may be an optical coupler that operates as a result of positioning the utility waveguide 16 sufficiently close to the reference waveguide 27 so that a portion of the light from the utility waveguide 16 couples into the reference waveguide 27. However, other signal tapping components, such as y-junctions, optical couplers, and MMIs can be used to couple a portion of the light signal from the utility waveguide 16 into the reference waveguide 27.

The portion of the outgoing LIDAR signal transmitted to the reference waveguide 27 may be referred to as a reference signal. The reference waveguide 27 carries the reference signal to the light-combining component 28.

In some embodiments, if the light-combining component 28 is a 2×2 MMI, the first LIDAR input signal and the reference signal may couple into the two inputs of the 2×2 MMI via the input waveguide 19 and the reference waveguide 27 respectively. The two input light signals may then interfere as they travel along the two arms of the MMI resulting in each output of the MMI carrying a combined portion of both the first LIDAR input signal and the reference signal. For example, the output light signal associated with the first arm of the MMI may include a portion of the first LIDAR input signal and a portion of the reference signal and the output light signal associated with the second arm of the MMI may include a remaining portion of the first LIDAR input signal and a remaining portion of the reference signal. In some embodiments, there may be a phase shift (e.g, 0 to π) between output light signals of the first arm and the second arm of the MMI. The output light signals associated with the two arms of the MMI may be referred to as a first composite signal and a second composite signal, wherein the first and the second composite signals including portions of the first LIDAR input signal and portions of the reference signal. The first composite signal may couple into a first detector waveguide 36 and the second composite signal may couple into a second detector waveguide 38. The first detector waveguide 36 may then transmit the first composite signal to the first light sensor 40 and the second detector waveguide 38 may transmit the second composite signal to the second light sensor 42.

The first light sensor 40 may then convert the first composite signal into a first electrical signal. The second light sensor 42 may convert the second composite signal into a second electrical signal. For example, the first light sensor 40 and the second light sensor 42 respectively convert the first composite signal and the second composite signal into photodetector currents that vary in time. Examples of the light sensors include photodiodes (PDs), and avalanche photodiodes (APDs).

In some embodiments, the first light sensor 40 and the second light sensor 42 may be configured as balanced photodetectors in a series arrangement to cancel out direct current (DC) components associated with their respective photocurrents. The balanced photodetector configuration can reduce noise and/or improve detection sensitivities associated with the photodetectors.

In some embodiments, the light-combining component 28 need not include light-splitting functionality. As a result, the illustrated light light-combining component 28 can be a 2×1 light-combining component rather than the illustrated 2×2 light-combining component and a single light sensor can replace the first light sensor 40 and the second light sensor 42 to output a single data signal. For example, the illustrated light light-combining component can be a 2×1 MIMI device with two input arms and one output arm. If the light combining component is a 2×1 MMI, the chip can include a single detector waveguide, instead of the first and second detector waveguides, that carries a single composite signal, from the output arm of the 2×1 MMI, to the single light sensor.

The LIDAR chip can include a control branch 55 for controlling operation of the light source 10. The control branch may include a directional coupler 56 that can couple a portion of the outgoing LIDAR signal from the utility waveguide 16 into a control waveguide 57. The coupled portion of the outgoing LIDAR signal transmitted via the control waveguide 57 serves as a tapped signal. In some embodiments, other signal-tapping photonic components, such as y-junctions and/or MMIs, may be used in place of the directional coupler 56 illustrated in FIG. 1.

The control waveguide 57 can carry the tapped signal to an interferometer 58 that splits the tapped signal and then re-combines different portions of the tapped signal that are respectively offset in phase with respect to each other. The interferometer 58 may be a Mach-Zhender interferometer (MZI) comprising two unequal arms along which the split-up portions of the input signal travel before re-combining (e.g., interfering) towards the end; however, other interferometer configurations may be used. The interferometer signal output may be characterized by an intensity that is largely a function of the frequency of the tapped outgoing LIDAR signal. For example, the MZI may output a sinusoidal signal characterized by a fringe pattern.

The sinusoidal signal from the interferometer 58 can couple into an interferometer waveguide 60 and can function as an input to a control light sensor 61. The control light sensor 61 may convert the sinusoidal light signal into an electrical signal that can serve as an electrical control signal. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For example, the control light sensor 61 can be replaced with a balanced photodetector arrangement including two light sensors arranged in series as described earlier with respect to the balanced photodetector arrangement of the first light sensor 40 and the second light sensor 42.

Electronics 62 can operate one or more components on the chip. For instance, the electronics 62 can be in electrical communication with and control operation of the light source 10, the first light sensor 40, the second light sensor 42, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 may operate the light source 10 such that the light source 10 emits the outgoing LIDAR signal. In some embodiments, the electronics may control the chirp frequency and/or the chirp duration of the outgoing LIDAR signal as described earlier with respect to FIG. 1. The electronics 62 may operate the LIDAR chip through a series of data cycles, wherein LIDAR data is generated for each (radial distance and/or radial velocity between the LIDAR system and a reflecting object) data cycle. A duration of each data cycle may correspond to the chirp duration of either increasing or decreasing chirp frequency of the outgoing LIDAR signal and thereby, the LIDAR output signal.

In some embodiments, each data cycle may correspond to one or more chirp durations thereby including one or more data periods that respectively correspond to increasing or decreasing chirp frequencies of the outgoing LIDAR signal. For example, one data cycle may correspond to two chirp durations effectively encompassing an up-ramp chirp duration and a down-ramp chirp duration. As another example, one data cycle may correspond to three chirp durations effectively encompassing an up-ramp, down-ramp and another up-ramp chirp duration.

During each data period, the electronics 62 may tune the chirp frequency of the outgoing LIDAR signal. As will be described in more detail below, the electronics 62 can employ output from the control branch in order to control the chirp frequency of the outgoing LIDAR signal such that the chirp frequency of the outgoing LIDAR signal, and consequently the LIDAR output signal, as a function of time is known to the electronics. In some instances, a data cycle includes a first data period, such as a first chirp duration, and a second data period, such as a second chirp duration. During the first chirp duration, the electronics 62 may increase the frequency of the outgoing LIDAR signal and during the second chirp duration the electronics 62 may decrease the frequency of the outgoing LIDAR signal or vice versa.

When the outgoing LIDAR signal frequency is increased during the first chirp duration, the LIDAR output signal travels away from the LIDAR chip and an object positioned in a sample region of a field of view may reflect light from the LIDAR output signal. At least a portion of the reflected light is then returned to the chip via the first LIDAR input signal as described earlier. During the time that the LIDAR output signal and the first LIDAR input signal are traveling between the chip and the reflecting object, the frequency of the outgoing LIDAR signal may continue to increase. Since a portion of the outgoing LIDAR signal is tapped as the reference signal, the frequency of the reference signal continues to increase. As a result, the first LIDAR input signal enters the light-combining component 28 with a lower frequency than the reference signal concurrently entering the light-combining component. Additionally, the further the reflecting object is located from the chip, the more the frequency of the reference signal increases before the first LIDAR input signal returns to the chip because the further the reflecting object is located, the greater will be the round-trip delay associated with the outgoing LIDAR signal exiting the LIDAR chip as the LIDAR output signal and returning as the first LIDAR input signal. Accordingly, the larger the difference between the frequency of the first LIDAR input signal and the frequency of the reference signal, the further the reflecting object is from the chip. As a result, the difference between the frequency of the first LIDAR input signal and the frequency of the reference signal is a function of the distance between the chip and the reflecting object.

For the same reasons, when the outgoing LIDAR signal frequency is decreased during the second data period, the first LIDAR input signal enters the light-combining component with a higher frequency than the reference signal concurrently entering the light-combining component and the difference between the frequency of the first LIDAR input signal and the frequency of the reference signal during the second data period is also function of the distance between the LIDAR system and the reflecting object.

In some instances, the difference between the frequency of the first LIDAR input signal and the frequency of the reference signal can also be a function of the Doppler effect because relative movement of the LIDAR system and the reflecting object can also affect the frequency of the first LIDAR input signal. For instance, when the LIDAR system is moving toward or away from the reflecting object and/or the reflecting object is moving toward or away from the LIDAR system, the Doppler effect can affect the frequency of the first LIDAR input signal. Since the frequency of the first LIDAR input signal is a function of the radial velocity between the reflecting object and the LIDAR system, the difference between the frequency of the first LIDAR input signal and the frequency of the reference signal is also a function of the radial velocity between the reflecting object and the LIDAR system. Accordingly, the difference between the frequency of the first LIDAR input signal and the frequency of the reference signal is a function of the distance and/or radial velocity between the LIDAR system and the reflecting object.

The composite signal may be based on interference between the first LIDAR input signal and the reference signal that can occur within the light-combining component 28. For instance, since the 2×2 MMI guides the first LIDAR input signal and the reference signal over two paths in close proximity to each other, and these signals have different frequencies, there is beating between the first LIDAR input signal and reference signal. Accordingly, the composite signal can be associated with a beat frequency related to the frequency difference between the first LIDAR input signal and the reference signal and the beat frequency can be used to determine the difference in the frequency between the first LIDAR input signal and the reference signal. A higher beat frequency for the composite signal indicates a higher differential between the frequencies of the first LIDAR input signal and the reference signal. As a result, the beat frequency of the data signal is a function of the distance and/or radial velocity between the LIDAR system and the reflecting object.

The beat frequencies ($f_{LDP}$) from two or more data periods or chirp durations may be combined to generate LIDAR data that may include frequency domain information, distance and/or radial velocity information associated with the reflecting object. For example, a first beat frequency that the electronics 62 determine from a first data period ($DP_1$) can be combined with a second beat frequency that the electronics determine from a second data period ($DP_2$) to determine a distance of the reflecting object from the LIDAR system and in some embodiments, a relative velocity between the reflecting object and the LIDAR system.

The following equation can apply during the first data period during which the electronics 62 may linearly increase the frequency of the outgoing LIDAR signal: $f_{ub} = -f_d + \alpha\tau$, where $f_{ub}$ is the beat frequency, and $f_d$ represents the Doppler shift ($f_d = 2\nu f_c/c$), where $f_c$ represents the optical frequency ($f_o$), c represents the speed of light, $\nu$ is the radial velocity between the reflecting object and the LIDAR system where the direction from the reflecting object toward the chip is assumed to be the positive direction. The following equation can apply during the second data period where electronics linearly decrease the frequency of the outgoing LIDAR signal: $f_{db} = -f_d - \alpha\tau$, where $f_{db}$ is the beat frequency. In these two equations, $f_d$ and $\tau$ are unknowns. The electronics 62 can solve these two equations for the two unknowns. The radial velocity for the reflecting object with the sampled region can then be determined from the Doppler shift ($\nu = c^* f_d/(2f_c)$) and the separation distance between the reflecting object in that sampled region and the LIDAR chip can be determined from $c^* f_d/2$.

In instances where the radial velocity between the LIDAR chip and the reflecting object is zero or very small, the contribution of the Doppler effect to the beat frequency is essentially zero. In these instances, the Doppler effect may not make a substantial contribution to the beat frequency and the electronics 62 may use the first data period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during a data period, the electronics 62 can have a range of preset values for the electrical control signal magnitude as a function of time. At multiple different times during a data period, the electronics 62 can compare the electrical control signal magnitude to the range of preset values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

Figure 3:
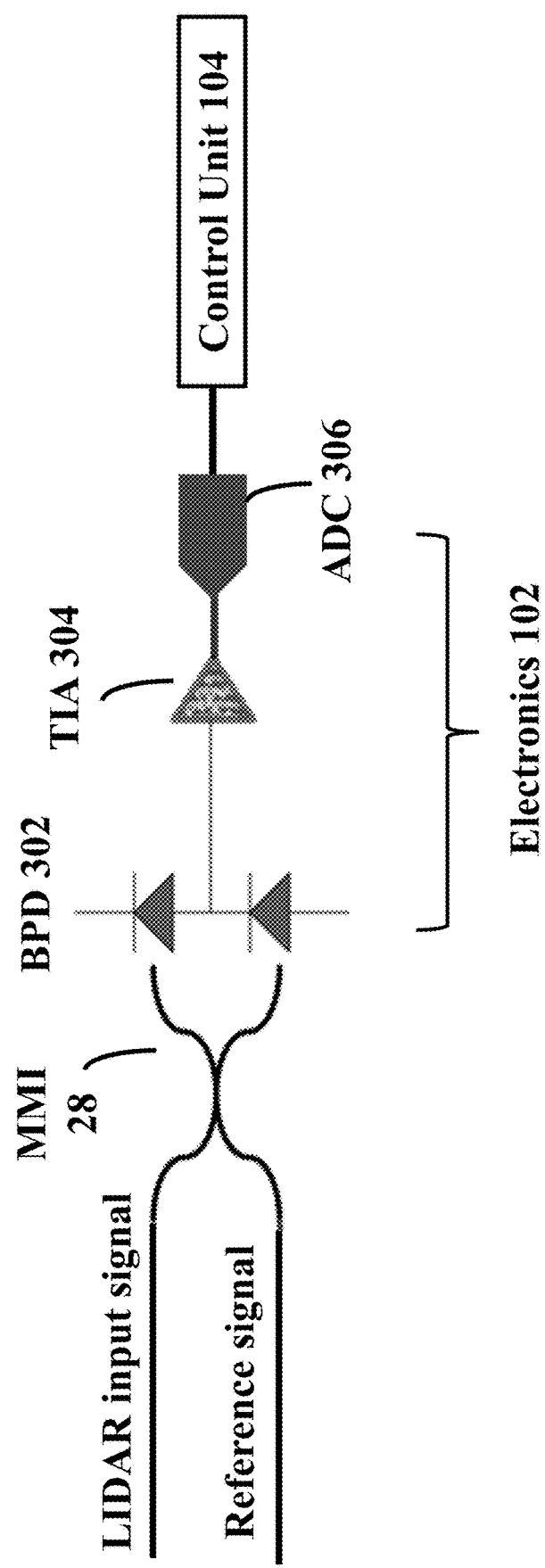
FIG. 3 shows an example illustration of electronics, control, and processing circuitry interfacing with a photonic component of the imaging device in accordance with various embodiments described herein.

FIG. 3 illustrates an exemplary configuration of a portion of the LIDAR chip of FIG. 2 in communication with additional electronic, control, and/or processing circuitry. For example, the light combining component 28 (e.g., 2×2 MMI) of FIG. 2 may interface with a transducer element, such as the balanced photodetector (BPD) 302, and/or a transimpedance amplifier (TIA) 304 that is electrically connected to an analog-to-digital converter (ADC) 306 and the control unit 104.

The TIA 304 may be configured to convert the time varying photocurrent output of the balanced photodetector 302 arrangement into a time varying voltage signal or beat signal that has the beat frequency as described above with reference to FIG. 2. According to some embodiments, the beat signal may be largely sinusoidal and may be a function of at least the relative velocity between the LIDAR chip and the reflecting object. For example, if the LIDAR chip and the reflecting object are moving towards each other, the beat signal may increase in frequency and vice-versa. The beat signal can then serve as an input to the ADC 306 that samples the beat signal based on a predetermined sampling frequency to generate a sampled or quantized beat signal output. The predetermined sampling frequency may be based on a maximum range of operation of the LIDAR system. In some instances, the predetermined sampling frequency may be based on the maximum range of operation of the LIDAR system and a maximum relative velocity between the scanned target and the LIDAR chip. In some embodiments, the sampling frequency may vary between 100 MHz and 400 MHz. The sampled beat signal output of the ADC 306 may be electrically connected to the control unit 104 for estimating the beat frequency.

The balanced photodetector may comprise the light sensors 40 and 42 arranged in series as described above with respect to FIG. 2. The TIA 304 may be included on the LIDAR chip or separate from the LIDAR chip. The ADC 306 may be a discrete component or part of additional processing elements that may comprise a part of the control unit 104. In alternative embodiments, the 2×2 MMI 28 may be replaced by a 2×1 MMI as described above with respect to FIG. 2. The control unit 104 may include one or more DSPs, ASICs, FPGAs, CPUs, or the like.

FIGS. 4A-B show a comparative illustration of a propagation path of an outgoing signal (e.g., the LIDAR output signal) and a propagation path of an incoming signal (e.g., the first LIDAR input signal) for demonstrating the walk-off effect. For example, FIG. 4A shows the propagation path of the outgoing signal. The propagation path of the outgoing signal may coincide with an optical axis of the imaging system that may be based on an optical alignment of the PIC 101, lens 402 and/or a scanning mirror 404 that may be part of the scanning module 106. The LIDAR output signal may follow the propagation path of FIG. 4A and the scanning mirror 404 may control an incident direction of the outgoing signal. A scan rate for the scanning mirror 404 may correspond to the fast-axis scan speed as described earlier with respect to FIG. 1.

FIG. 4B shows the propagation path of an incoming signal after reflection from an object within a targeted FOV of the imaging system. Due to continuous rotation of the scanning mirror 404 about an axis (e.g., fast-axis and slow-axis), the incoming signal may be offset from an input to the imaging chip (e.g., the LIDAR chip). For example, if the scanning mirror 404 rotates through a mechanical angle dφ during the time between the exit of the transmit beam and the reception of the reflected signal from the target (also known as the roundtrip delay), a deviation of the incoming signal from the optical axis of the imaging system may be approximately equal to 2 dφ. FIG. 4B represents the angle of deviation from the optical axis as dθ. In some instances, dθ may be based on at least one of a focal length of the lens 402, a current FOV of the scanning module 106, scan speed associated with the scanning mirror 404, and round-trip travel time for the signal, comprising the outgoing and the incoming signal, to travel between the scanning module 106 and the object.

If the incoming signal is offset away from the input to the imaging chip, the imaging system will fail to detect the corresponding object that reflected the outgoing signal to generate the incoming signal. For example, if the LIDAR system implements a high scan rate (e.g., greater than 100 Hz), the returning LIDAR signal may be directed away from the input facet of the LIDAR chip due to the scan rate dependent walk-off and the LIDAR system will fail to detect the returning LIDAR signal. In some instances, the scanner 106 may direct the returning LIDAR signal away from the port 206 of the circulator described earlier with respect to FIG. 2. Accordingly, at least a portion of the returning LIDAR signal will fail to couple into the first input waveguide 19 resulting in a loss of return photons and thereby, a loss of return signal that in turn will cause the LIDAR system to fail to detect the corresponding object.

Figure 5:
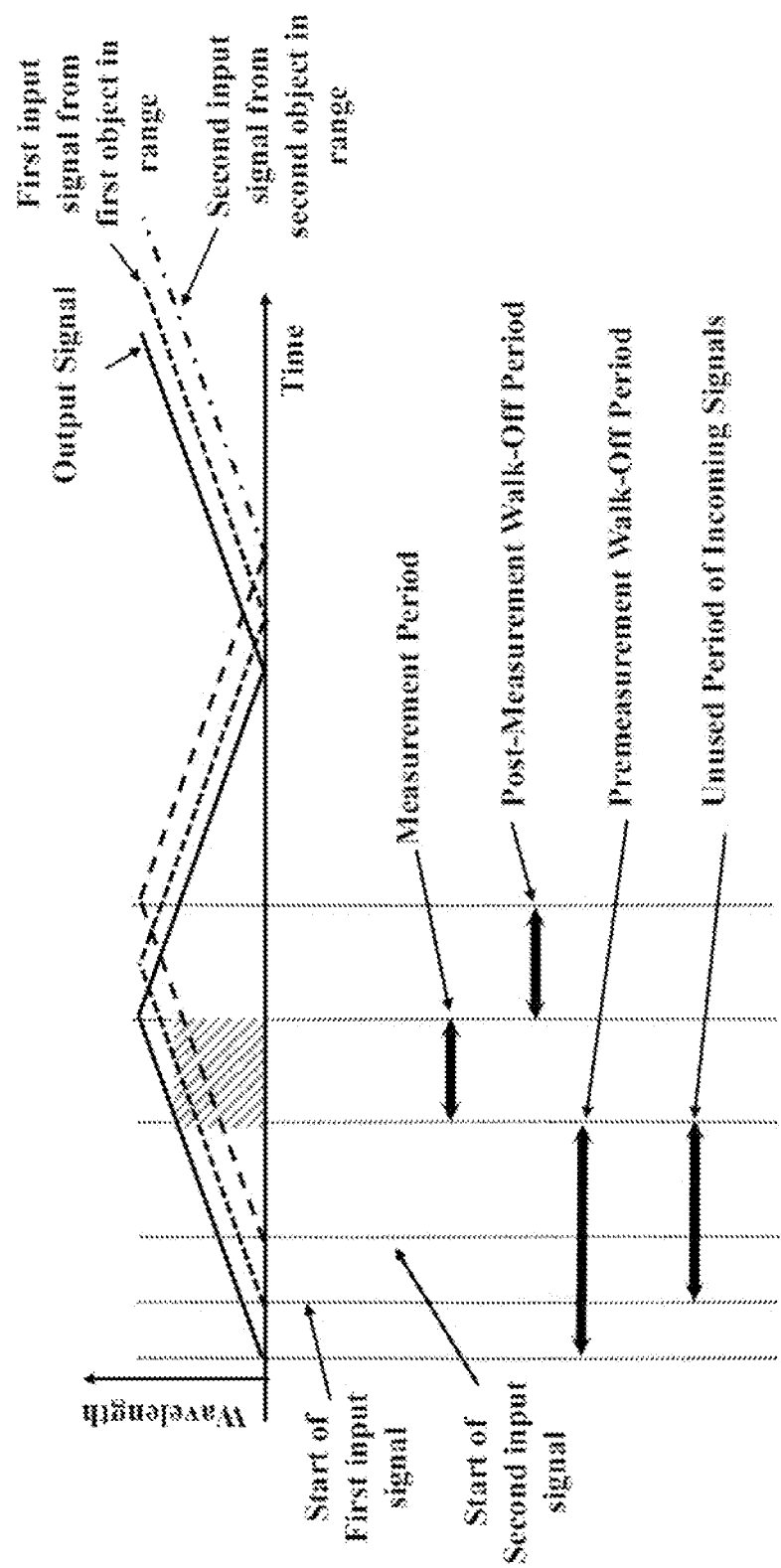
FIG. 5 shows a timing diagram of signals associated with the remote imaging system in accordance with various embodiments described herein.

FIG. 5 shows an exemplary timing diagram for the chirped output and input signals of the LIDAR system. The output signal, the first input signal and the second input signal can be seen to vary in wavelength, and therefore frequency, based on the chirp bandwidth and the chirp duration. The first input signal may correspond to a reflection of the output signal from a first object located within the range and FOV of the LIDAR system. The second input signal may correspond to a reflection of the same output signal from a second object located within the same range and the same FOV of the LIDAR system. Due to the greater time taken for the second input signal to arrive at the LIDAR chip, the second object can be estimated to be located at a proportional distance away from the LIDAR chip that is greater than a distance of the first object from the LIDAR chip. Each chirp duration (e.g., up-chirp and down-chirp) can include a measurement period, a premeasurement period, and a post-measurement period.

The measurement period can correspond to a portion of the chirp duration that is used for extracting useful signal segments from the returning LIDAR signals (e.g., the first input signal and the second input signal) associated with a current FOV. A first measurement period associated with the first chip duration is shown as a shaded portion common to the output signal, the first input signal and the second input signal.

The pre-measurement period may correspond to a time from a start of the current chirp duration up to the measurement period. The start of the current chirp duration may be based on control electronics that may modulate the laser current as described earlier with respect to FIGS. 1 and 2. The start of the current chirp duration may further depend on the chirp rate, the chirp duration, and the chirp bandwidth associated with the LIDAR output signal that may be determined by the control electronics. During the pre-measurement period, the scanning module 106 can continue to rotate. This can direct returning LIDAR signals at increasingly greater offset distances from the input facet of the LIDAR chip resulting in walk-off.

While the exemplary embodiment of FIG. 5 shows nearly equal up-chirp and down-chirp durations, in some instances, the up-chirp and the down-chirp durations may be different and the corresponding measurement periods may be different.

Figure 6:
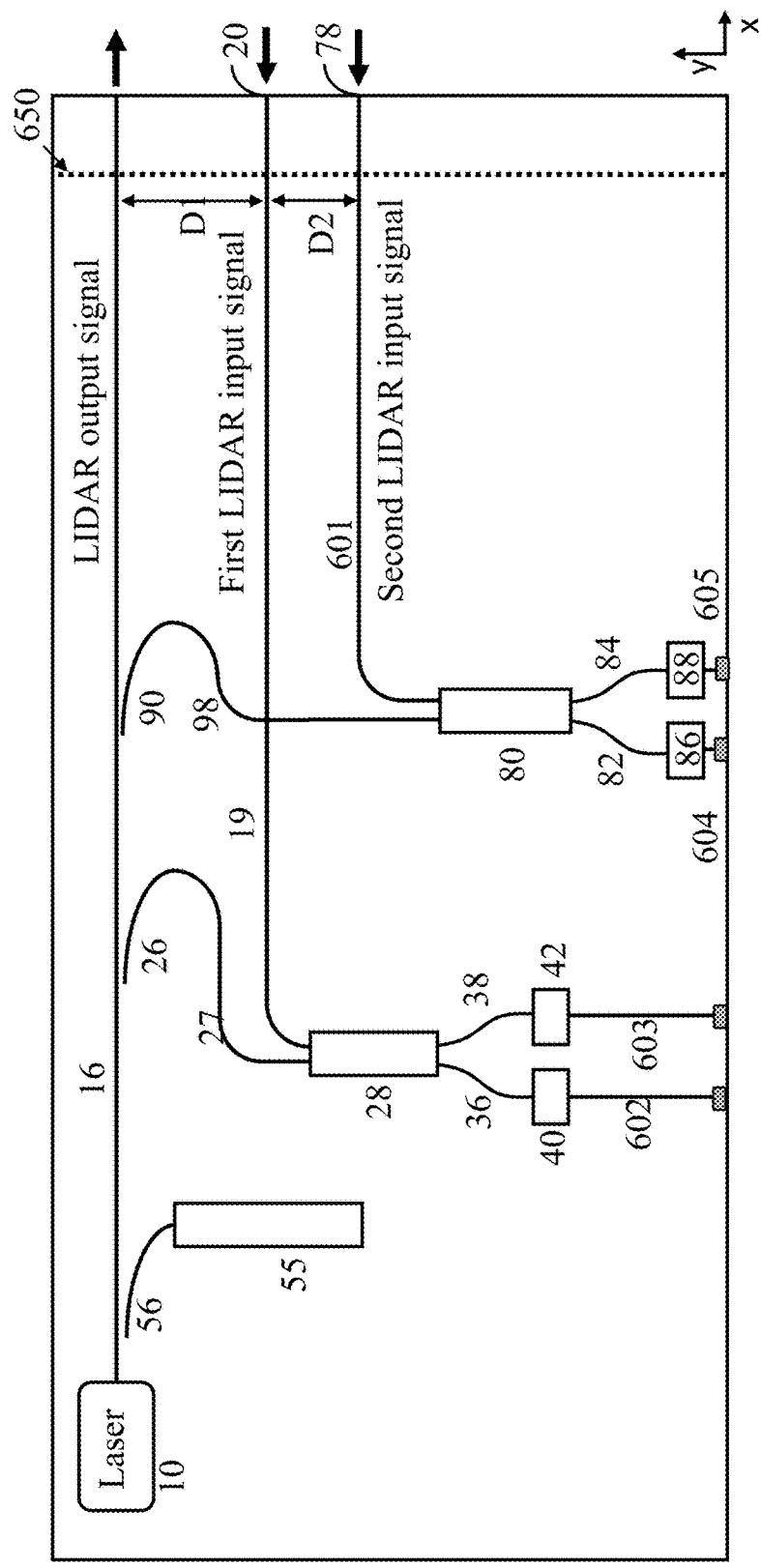
FIG. 6 shows an imaging device with walk-off compensation in accordance with various embodiments described herein.

The LIDAR chip of FIG. 2 can be modified to receive multiple LIDAR input signals via multiple input waveguides that are positioned at varying distances from the output waveguide for mitigating the walk-off effect. For instance, FIG. 6 illustrates the LIDAR chip of FIG. 2 modified to receive LIDAR input signals via two input waveguides, such as the first input waveguide 19 and a second input waveguide 601 without requiring a circulator for directing the input and output LIDAR signals. For example, in FIG. 2, the LIDAR output signal and the LIDAR input signal follow approximately the same propagation path after exiting port 206 of the circulator 218. As such, in the LIDAR chip of FIG. 2, the scanning module 106 and lens (e.g., lens 402) are configured to receive the LIDAR output signal from the port 206 and focus the LIDAR input signals at the same port 206. However, due to the walk-off effect, the scanning module 106 fails to focus all the returning LIDAR signals onto the port 206 depending upon the round-trip time of each of the returning LIDAR signals, the scan rate, operating wavelength range, and/or specifications of the lens. The LIDAR chip configuration of FIG. 6 is configured to mitigate the walk-off effect for returning LIDAR signals that are directed below the output waveguide 16 by separating the propagation paths of the LIDAR output signal and the returning LIDAR signals without requiring the circulator. This can significantly reduce costs associated with the total LIDAR chip because the circulator can be an expensive component.

Moreover, at higher scan speeds and/or with an increase in a minimum round-trip signal travel time associated with objects scanned within a given FOV and for a given range of detection, a probability of returning LIDAR signals being directed to the output waveguide facet decreases while a probability of the returning LIDAR signals being directed away from the output waveguide facet increases. For example, the returning LIDAR signals may be directed to a position below the output waveguide facet (e.g., at a lower position along the y-direction of FIG. 6) depending upon a direction of rotation of at least one mirror of the scanning module. In other instances, the returning LIDAR signals may be directed to a position above the output waveguide facet (e.g., at a higher position along they-direction of FIG. 6) and the multiple input waveguides of the LIDAR chip of FIG. 6 may be positioned above the output waveguide in order to efficiently receive the returning LIDAR signals and mitigate the scanning induced walk-off effect. Examples of scanning modules configured to mechanically rotate the one or more mirrors in one direction are polygon mirror based scanning modules.

The first input waveguide 19 may be positioned away from the output waveguide 16 by a first predetermined distance (D1) and spaced apart from each other by a second predetermined distance D2. In some embodiments, the first predetermined distance and/or the second predetermined distance may vary between 50 nm up to 10 μm. Various parameters may affect a selection of D1 and/or D2 including at least one of the range of operation (e.g., short-range <10 m, mid-range 10 m up to 50 m, and long-range >50 m), the wavelength range of operation (e.g., 1200 nm to 1320 nm, 1400 nm to 1590 nm, and 1900 to 2100 nm), the chirp duration, the chirp rate, the scanning module 106 parameters, specifications of the lens and/or collimators used to focus the optical signals (e.g., the LIDAR output signal, the first LIDAR input signal, and the second LIDAR input signal) to-and-from the LIDAR chip.

In some embodiments, determination of the first predetermined distance and the second predetermined distance may be based on the walk-off mitigation parameter. As described earlier, the walk-off mitigation parameter may be based on various parameters such as the FOV, the fast-axis speed, the slow-axis speed, the range of operation, the wavelength of operation, the chirp bandwidth, the chirp frequencies, and/or the chirp duration. The walk-off mitigation parameter may further be based on the optics (e.g., collimators, lenses, etc.) used in the imaging system (e.g., LIDAR system) and/or the waveguide coupling coefficient.

By implementing the multiple input waveguide configuration associated with a single outgoing LIDAR signal, the imaging system may achieve high scan rates (e.g., up to 10 kHz) without suffering from losses in the return signal. Moreover, the system may maintain a high scan resolution at the high scan rates over an extended range of operation due to increased efficiency of photon collection associated with photons returning at a later time from further away. For example, the system may maintain the high scan resolution at scan rates of approximately 100 Hz for a maximum range of operation of 300 m and a minimum range of operation of at least 20 m with walk-off mitigation instead of being limited to a maximum range of operation of approximately 80 m without any walk-off mitigation. The FOV associated with the system may vary between approximately 10 degrees to 180 degrees.

In some embodiments, the walk-off mitigation configuration that is associated with multiple input waveguides may be optimized for medium and/or long range of operation of the LIDAR system. This is because at shorter ranges, speckle effects may dominate over scanner related walk-off effects enabling the returning LIDAR signals to couple back via a same port (e.g., port 206 of circulator 218 of FIG. 2) as that of the outgoing LIDAR signal. In such instances, the effects of walk-off may not significantly hamper collection of later arriving photons.

In some other embodiments, the LIDAR system may be operated at high scanning speeds, e.g., over 500 Hz, thereby increasing the effect of walk-off over a short range of operation (e.g., within 15 m). As the scanning speed increases, the walk-off effects may start to dominate over speckle even for shorter distances. After crossing a predetermined threshold of scanning speed, it may become necessary to use the multiple input waveguide configuration of FIG. 6 to mitigate these walk-off effects. For example, beyond a threshold scanning speed of 500 Hz for the fast axis, the multiple input waveguide configuration of FIG. 6 may be needed to efficiently capture photons returning from targets imaged over the shorter distances. Example of scanners include polygon scanners that rotate in one direction and MEMS scanners that have bi-directional rotation.

In some instances, the multiple input waveguides can be located on the PIC either below or above the output waveguide to correspond to the unidirectional polygon scanner rotation such that as the polygon scanner rotates, the returning LIDAR signals are directed towards a next adjacent input waveguide. In some other embodiments, the multiple input waveguides can be located on the PIC above and below the output waveguide to correspond to the bi-directional MEMS scanner rotation. The bi-directional rotation of the MEMS scanner can direct the returning LIDAR signals towards an adjacent input waveguide corresponding to a direction of rotation of the MEMS scanner. For example, the MEMS scanner may sequentially direct returning LIDAR signals across the input waveguides while rotating in one direction and then direct returning LIDAR across the input waveguides in a sequentially opposite direction while rotating in the other direction. Further details of this configuration are provided in FIG. 11.

A splitter 90 can be configured to divert a portion of the reference signal (i.e., a portion of the LIDAR output signal) carried on the output waveguide 16 onto a second reference waveguide 98. Accordingly, the first reference waveguide 27 carries a first reference signal and the second reference waveguide 98 carries a second reference signal.

The LIDAR output signal travels away from the chip and may be reflected by one or more objects. The reflected signal travels away from the objects and at least a portion of the reflected signal from a first object may enter the LIDAR chip via the facet 20 and at least a portion of the reflected signal from a second object may enter the LIDAR chip via the facet 78. The first LIDAR input signal from facet 20 may be transmitted to the first light-combining component 28 via the first input waveguide 19 and the second LIDAR input from facet 78 may be transmitted to a second light-combining component 80 via a second input waveguide 76. The second input waveguide. The second LIDAR input signal that is transmitted to the second light-combining component 80 acts as a second first LIDAR input signal.

The second light-combining component 80 may combine the second LIDAR input signal and the second reference signal into composite signals that respectively contain a portion of the second LIDAR input signal and a portion of the second reference signal. Each of the composite signals may respectively couple into detector waveguides 82 and 84. The second reference signal includes a portion of the light from the outgoing LIDAR signal. For example, the second reference signal samples a portion of the outgoing LIDAR signal. The second LIDAR input signal may be associated with light reflected by the second object in a field of view of the LIDAR system while the second reference signal is not associated with the reflected light. When the LIDAR chip and the reflecting object are moving relative to one another, the second LIDAR input signal and the second reference signal may have different frequencies at least partially due to the Doppler effect. The difference in the respective frequencies of the second LIDAR input signal and the second reference signal can generate a second beat signal.

The third detector waveguide 82 may carry the respective composite signal to a third light sensor 86 that converts the composite light signal into a third electrical signal. The fourth detector waveguide 84 may carry the respective composite sample signal to a fourth light sensor 88 that converts the composite light signal into a fourth electrical signal.

The second light combining component 80, the associated third light sensor 86 and the associated fourth light sensor 88 can be connected in the BPD arrangement as described earlier with respect to FIG. 2 to output a corresponding electrical signal via electrical lines 604 and 605 that may each terminate at a bond pad at an edge of the LIDAR chip. The electrical lines 602 and 603 from the first light sensor 40 and the second light sensor 42 respectively, may also terminate at bond pads at an edge of the LIDAR chips. The electrical lines 602, 603, 604 and 605 may be configured to carry corresponding electrical signals from the light sensors to one or more TIAs as described earlier with respect to FIG. 3. For example, the electrical lines 602 and 603 may electrically couple the first light sensor 40 and the second light sensor 42 with the TIA 304. As another example, the electrical lines 604 and 605 may electrically couple the third light sensor 86 and the fourth light sensor 88 with a second TIA that can be electrically connected to a second ADC. The output of the ADC can further serve as an additional input to the processing unit 208 for estimating a second beat frequency associated with the second LIDAR input signal.

Examples of the third and fourth light sensors include avalanche photodiodes and PIN photodiodes. The functions of the illustrated second light-combining component 80 can be performed by more than one optical component including adiabatic splitters, directional couplers, and/or MMI devices.

The electronics 62 can operate one or more components on the LIDAR chip of FIG. 6 to generate LIDAR outputs signals over multiple different cycles as described above. Additionally, the electronics 62 can process the additional electrical signals as described above in the context of FIG. 2. Accordingly, the electronics can generate second LIDAR data results based on the second composite signal and/or LIDAR data results based on the first and second electrical signals.

Figure 7:
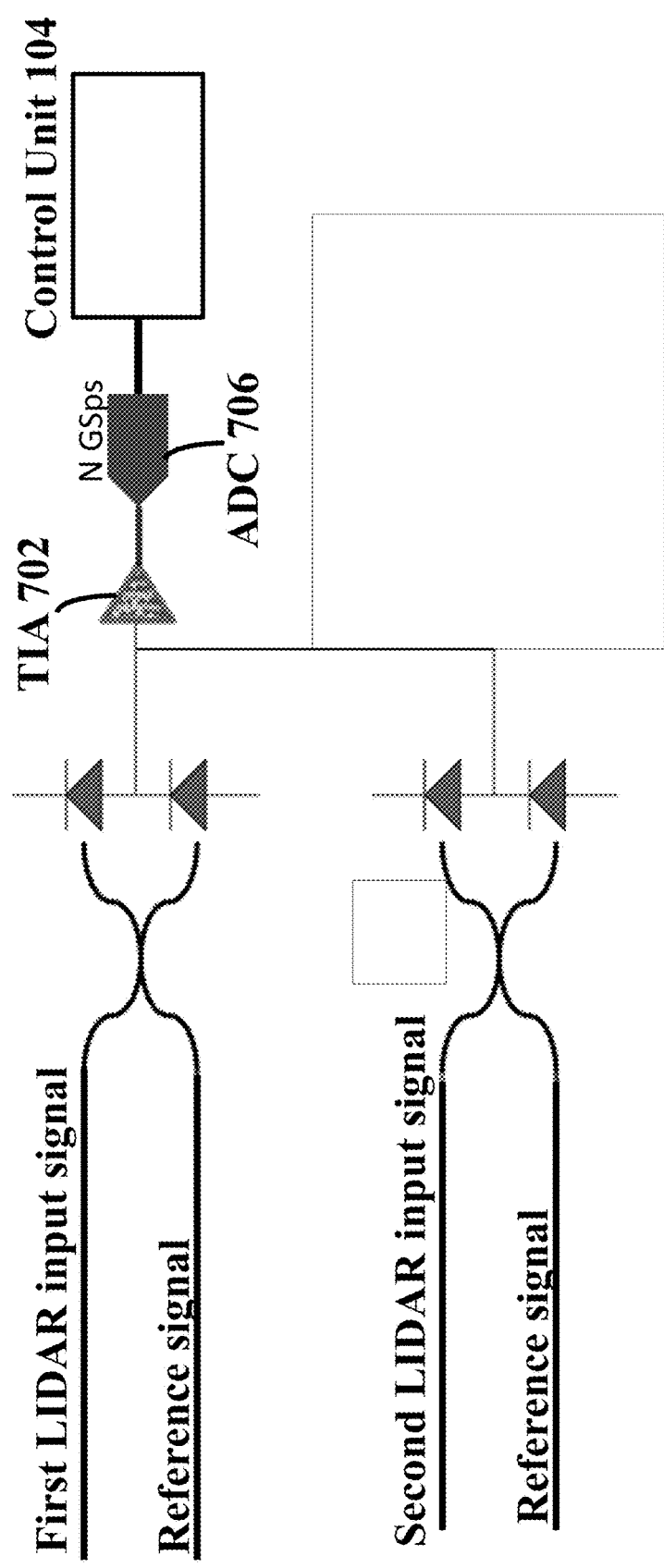
FIG. 7 shows an example illustration of electronics, control, and processing circuitry interfacing with at least one photonic component of the imaging device with walk-off compensation in accordance with various embodiments described herein.

FIG. 7 shows a configuration of a portion of the LIDAR chip of FIG. 6 in communication with additional electronic, control, and/or processing circuitry including BPDs, a TIA 702, an ADC 706, and a control unit 704. The BPDs may convert the composite signals respectively associated with the first LIDAR input signal and the second LIDAR input signal into time varying photocurrent outputs. Each of the photocurrent outputs may be combined before interfacing with the TIA 702. The output of the TIA 702 may be a time varying voltage signal or beat signal as described earlier with respect to FIG. 6.

According to some embodiments, the beat signal may be largely sinusoidal and may be a function of at least the relative velocity between the LIDAR chip and the reflecting object. For example, if the LIDAR chip and the reflecting object are moving towards each other, the beat signal may increase in frequency and vice-versa. The beat signal can then serve as an input to the ADC 706 that samples the beat signal based on a predetermined sampling frequency of N GSPS to generate a sampled or quantized beat signal output. By combining the two BPD photocurrent outputs and using just a single TIA and ADC, an overall power consumption and/or footprint of the imaging device may be reduced.

The path lengths of the electrical connections between each of the BPDs and an input of the TIA may be approximately the same in some cases. In other instances, the path lengths of the electrical connections between each of the BPDs and the TIA input may be different.

The predetermined sampling frequency may be based on a maximum range of operation of the LIDAR system. In some instances, the predetermined sampling frequency may be based on the maximum range of operation of the LIDAR system and a maximum relative velocity between the scanned target and the LIDAR chip. In some embodiments, the sampling frequency may vary between 100 MHz and 400 MHz. The sampled beat signal output of the ADC 306 may be electrically connected to the control unit 104 for estimating the beat frequency.

The balanced photodetector may comprise light sensors arranged in series as described above with respect to FIG. 6. The TIA 702 may be included on the LIDAR chip or separate from the LIDAR chip. The ADC 706 may be a discrete component or part of additional processing elements that may comprise a part of the control unit 704. In alternative embodiments, the 2×2 MMI 28 may be replaced by a 2×1 MMI as described above with respect to FIG. 2. The control unit 704 may include one or more DSPs, ASICs, FPGAs, CPUs, or the like.

Figure 8:
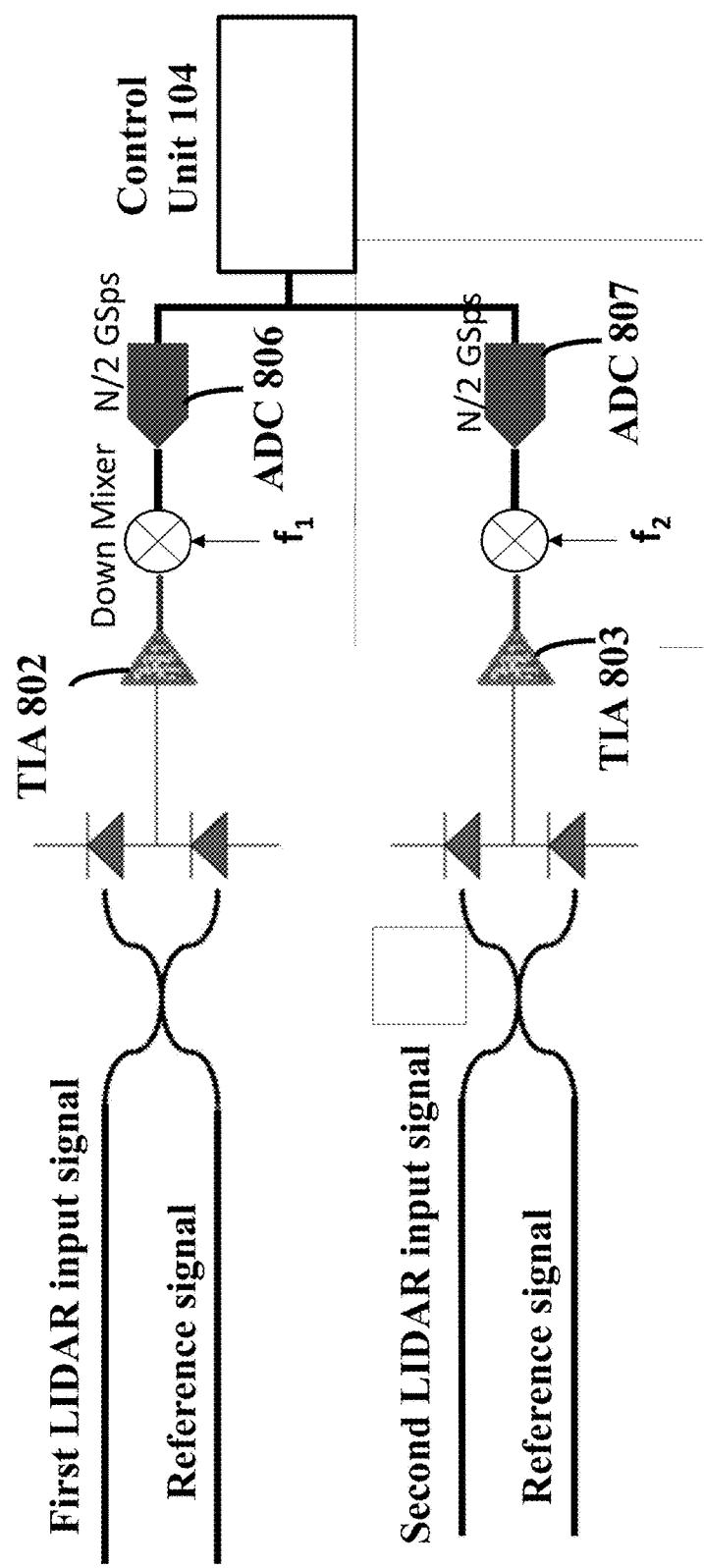
FIG. 8 shows an example illustration of electronics, control, and processing circuitry interfacing with at least one photonic component of the imaging device with walk-off compensation in accordance with various embodiments described herein.

In some embodiments, an output of a TIA connected to the BPDs of FIG. 6 may be connected to a down mixer for down converting a frequency associated with the respective beat signal as shown in FIG. 8. For example, TIA 802 may connect the photocurrent associated with the first beat signal to a first down mixer for mixing with a frequency f1 and down converting a frequency associated with the first beat signal. This may allow the use of a lower speed ADC, such as ADC 806, that may sample the first beat signal at a reduced sampling rate of N/2 GSPS, instead of the N GSPS ADC 706 described in FIG. 7. As another example, TIA 803 may connect the photocurrent associated with the second beat signal to a second mixer for mixing with a frequency f2 and down converting a frequency associated with the second beat signal. ADC 807 can then sample the second beat signal at a reduced sampling rate of N/2 GSPS. An advantage of using a lower speed ADC can be reduced costs.

The frequencies f1 and f2 may be optimized based on at least a range of operation of the LIDAR system, type of scanner (e.g., MEMS, polygon, etc.), speed of scanning associated with the fast axis frequency and the slow axis frequency, chirp bandwidth, and a configuration of the PIC (e.g., common input and output ports such as port 206, different input and output facets respectively associated with two or more input waveguides, etc.) Additionally, the selection of the different TIA and ADC configurations (e.g., the single TIA and ADC corresponding to a combined photocurrent and multiple TIAs and ADCs respectively corresponding to each BPD photocurrent output) may be based on the factors listed above including the range of operation of the LIDAR system, the type of scanner (e.g., MEMS, polygon, etc.), the speed of scanning associated with the fast axis frequency and the slow axis frequency, and the configuration of the PIC.

For example, for a chirp bandwidth of approximately 1 GHz, f1 may be approximately zero, and f2 may be approximately 500 MHz. As another example, for a four-input waveguide configuration with four separate photocurrent paths, each interfacing with a respective TIA, f1 may be approximately zero and f2 may be 250 MHz. Each of the TIAs may then electrically connect to a respective down mixer, such as a third and a fourth down mixer, that mixes the corresponding TIA output with a third frequency f3 and a fourth frequency f4. In some embodiments, f3 may be approximately 500 MHz and f4 may be approximately 750 MHz. This may allow the use of four cheaper lower speed ADCs that may sample the respective beat signals at the reduced sampling rate of N/2 GSPS.

Figure 9:
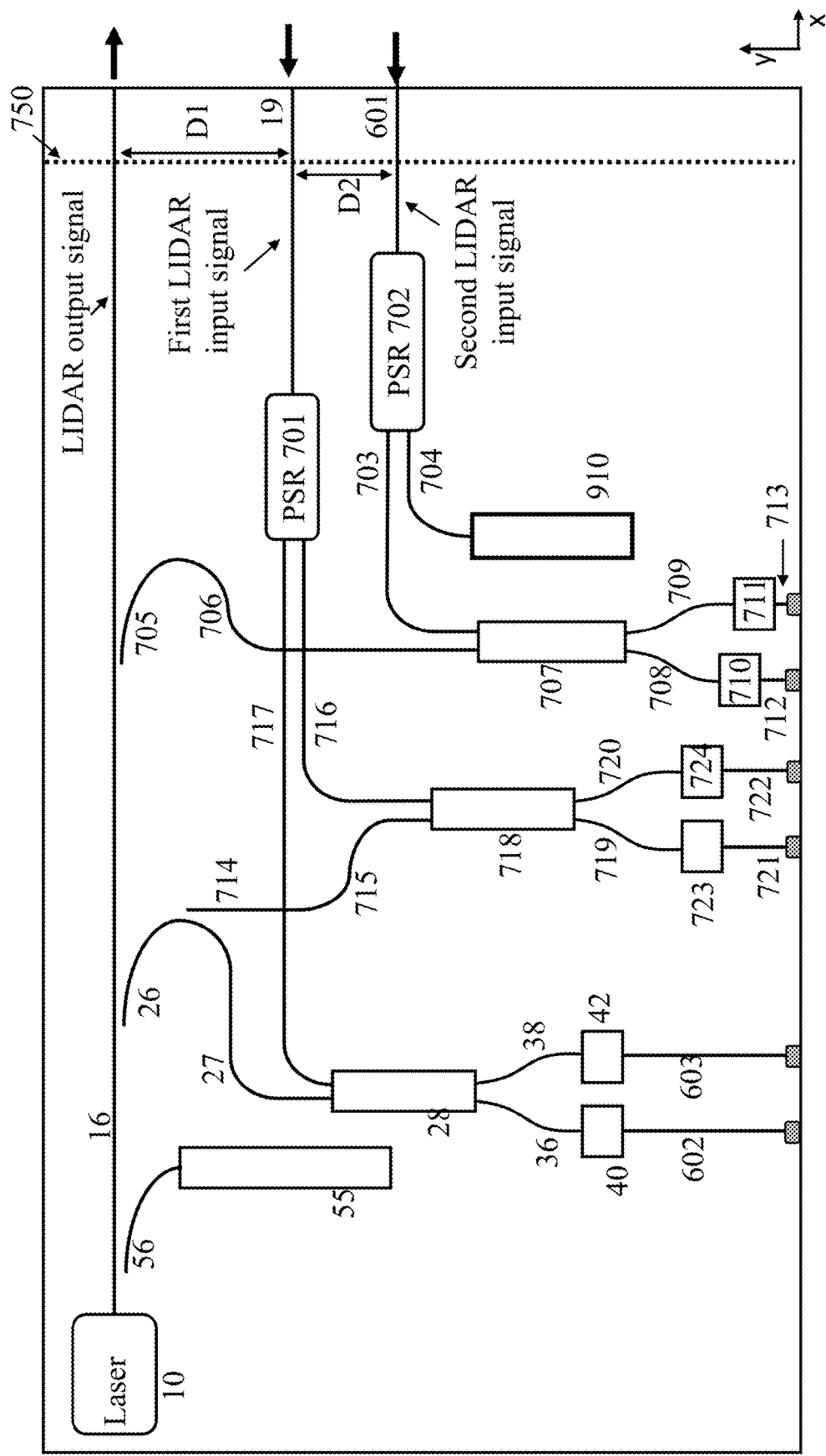
FIG. 9 shows an imaging device with walk-off compensation in accordance with various embodiments described herein.

FIG. 9 shows a LIDAR chip configured to mitigate walk-off and provide polarization separation of the incoming LIDAR signals. This can be achieved by modifying the LIDAR chip of FIG. 6 and including a polarization splitter and rotator (PSR) along a propagation path of each of the LIDAR input signals. For example, a PSR 701 may be introduced along the propagation path of the first LIDAR input signal. Input waveguide 19 may terminate at an input facet of the PSR 701 that may separate the first LIDAR input signal into two separate optical signals associated with different polarizations. Accordingly, the first LIDAR input signal may be split into a transverse electric (TE) component and a transverse magnetic (TM) component that can propagate along waveguides 716 and 717 respectively or vice versa depending upon the configuration of the PSR 701.

A second PSR 702 may be introduced along the propagation path of the second LIDAR input signal. Input waveguide 601 may terminate at an input facet of the PSR 702 that may then separate the second LIDAR input signal into two separate optical signals associated with a TE polarized component and a TM polarized component. Each polarization component may then propagate along waveguides 703 and 704 depending upon the configuration of the PSR 702. The light combining components of FIG. 9 including 718, 707, and 910 may be similar to the light combining component 28 as described earlier with respect to FIGS. 2 and 6. The light combining component 910 may include two output arms (not shown) that couple the optical signal output to a BPD arrangement similar to that of the light sensor pairs 40 and 42, 723 and 724, and 710 and 711.

Each light combining component may be associated with a reference signal input that includes a portion of the outgoing LIDAR signal and a portion of the corresponding LIDAR input signal. For example, a splitter or directional coupler 714 may couple a portion of the reference signal from waveguide 27 onto waveguide 715 that can terminate at a first input of the light combining component 718. If the PSR 701 couples the TM component of the first LIDAR input signal with waveguide 716 and the TE component with waveguide 717, the TM component of the optical signal can serve as a second input to the light combining component 718 while the TE polarized component can serve as a second input to the light combining component 28. In other instances, if the PSR 701 couples the TE component of the first LIDAR input signal with the waveguide 716 and the TM component with the waveguide 717, the TE component can serve as the second input to the light combining component 718 while the TM component can serve as the second input to the light combining component 28.

As another example, an additional splitter or directional coupler 705 may couple a portion of the LIDAR output signal from the waveguide 16 onto waveguide 706 that can terminate at a first input of the light combining component 707. If the PSR 702 couples the TM component of the first LIDAR input signal with waveguide 704 and the TE component with waveguide 703, the TM component of the optical signal can serve as a second input to the light combining component 910 while the TE component can serve as a second input to the light combining component 707. In other instances, if the PSR 702 couples the TE component of the first LIDAR input signal with the waveguide 704 and the TM component with the waveguide 703, the TE component can serve as the second input to the light combining component 910 while the TM component can serve as the second input to the light combining component 707.

Examples of polarization rotators include, but are not limited to, mechanically rotated polarization-maintaining fibers, Faraday rotators, half-wave plates, MEMs-based polarization rotators, and integrated optical polarization rotators using asymmetric y-branches, Mach-Zehnder interferometers and multi-mode interference couplers.

In some embodiments, a birefringent crystal that transmits TE polarized and TM polarized light at different angles may be used for achieving polarization separation of the returning LIDAR signals. For example, the birefringent crystal may be positioned between the scanning module and the LIDAR chip along the propagation path of the returning LIDAR signals. The birefringent crystal may then transmit a TE component of the first LIDAR input signal at a different angle from a TM component of the first LIDAR input signal. Due to continuous mechanical rotation of the one or more mirrors of the scanning module, the second LIDAR input signal may be incident on the birefringent crystal at a different angle from that of the first LIDAR input signal. Therefore, the birefringent crystal will transmit a TE component and a TM component of the second LIDAR input signal at angles that are different from the transmitted angles of the TE and TM components of the first LIDAR input signal.

For example, a LIDAR chip with four input waveguides, wherein two input waveguides are associated with the first LIDAR input signal and the remaining two input waveguides are associated with the second LIDAR input signal can be configured to receive four input signals that are each associated with a specific polarization state (e.g., TE and TM) of the first LIDAR input signal and the second LIDAR input signal. The birefringent crystal positioned between the LIDAR chip and the scanning module can then split the first LIDAR input signal and the second LIDAR input signal into the four respective input signals that are each associated with the TE polarization state or the TM polarization state.

The birefringent crystal may be positioned off-chip. LIDAR systems that include birefringent crystals may not need the on-chip PSR. Instead, the LIDAR chip may include the polarization rotator while the birefringent crystal performs the polarization separation off-chip. The LIDAR chip can then be configured to receive multiple input signals via multiple input waveguides that are spaced apart depending upon an angle of deviation associated with each polarization component of each of the input signals upon passing through the birefringent crystal.

In some embodiments, the PSR may be replaced by an on-chip OPA configured to perform polarization separation of the input signals. An input optical signal can be split into different polarization dependent components by tuning a respective propagation constant associated with each waveguide of the OPA. This effect may be attributed to waveguide birefringence that alters a spectral response of each waveguide to the input optical signal. Accordingly, the OPA can be configured to receive the first LIDAR input signal and the second LIDAR signal and split the two input signals into different polarization dependent components. For example, the OPA may receive the first LIDAR input signal and generate two optical signals corresponding to a TE polarized and a TM polarized component of the first LIDAR input signal. As another example, the OPA may receive the second LIDAR input signal and generate two optical signals corresponding to a TE polarized and a TM polarized component of the second LIDAR input signal.

While the OPA and the birefringent crystal can be configured to provide polarization separation of the incoming LIDAR signals, a separate polarization rotator would still need to be incorporated in the LIDAR chip to enable polarization rotation of the incoming LIDAR signals.

As described earlier with respect to FIGS. 2, 3, and 6, each light combining component (e.g., 718, 707, and 910) may generate two output light signals that respectively couple to separate light sensors (e.g., 723, 724, 710, and 711) via corresponding detector waveguides (e.g., 719, 720, 708, and 709). Each of the light sensors may function as optical to electrical transducers and generate a corresponding electrical signal output that can couple to a corresponding TIA as described earlier with respect to FIGS. 2, 3, 7, and 8. The electrical signal outputs may be carried via corresponding electrical signal lines 721, 722, 712, and 713 to respective TIAs. In some embodiments, the TIAs and/or additional ADCs that connect to each of the TIAs may be located on the LIDAR chip whereas in alternative embodiments, the TIAs and/or the additional ADCs may be located on a separate mounting assembly and the electrical signal lines may terminate near an edge of the LIDAR chip at a plurality of wire bond pads.

In some embodiments, each pair of the light sensors, such as the third light sensor 723 and the fourth light sensor 724, and the fifth light sensor 710 and the sixth light sensor 711, may be configured as BPDs in a series arrangement to cancel out direct current (DC) components associated with their respective photocurrents. The balanced photodetector configuration can reduce noise and/or improve detection sensitivities associated with the photodetectors.

The above configurations result in the LIDAR data for a single sample region in the FOV being generated from multiple different electrical signals associated with the same sample region. In some instances, determining the LIDAR data for the sample region includes the electronics combining the LIDAR data from different electrical signals. Combining the LIDAR data can include taking an average, median, or mode of corresponding LIDAR data generated from each of the different electrical signals generated by the light sensors, TIAs and/or ADCs.

In some embodiments, the LIDAR data for a sample region may be determined based on the electronics selecting and/or processing one electrical signal out of a plurality of electrical signals that may be representative of the LIDAR data associated with the scanned sample region. The electronics can then use the LIDAR data from the selected electrical signal as the representative LIDAR data to be used for additional processing. The selected electrical signal may be chosen based on satisfying a predetermined SNR, a predetermined amplitude threshold, or a dynamically determined threshold level. For example, the electronics may select the representative electrical signal based on the representative electrical signal having a larger amplitude than other electrical signals associated with the same sample region.

In some embodiments, the electronics may combine LIDAR data associated with multiple electrical signals for the same sample region. For example, the processing system may perform a FT on each of the composite signals and add the resulting FT spectra to generate combined frequency domain data for the corresponding sample region. In another example, the system may analyze each of the composite signals for determining respective SNRs and discard the composite signals associated with SNRs that fall below a certain predetermined SNR. The system may then perform a FT on the remaining composite signals and combine the corresponding frequency domain data after the FT. In some embodiments, if the SNR for each of the composite signals for a certain sample region falls below the predetermined SNR value, the system may discard the associated composite signals.

In some instances, the system may combine the FT spectra associated with different polarization states (e.g., TE and TM), and as a result, different electrical signals, of a same LIDAR input signal. This may be referred to as a polarization combining approach. In some other instances, the system may compare the FT spectra associated with the different polarization states of the same return LIDAR signal and may select the FT spectra with the highest SNR. This may be referred to as a polarization diversity-based approach.

Figure 10:
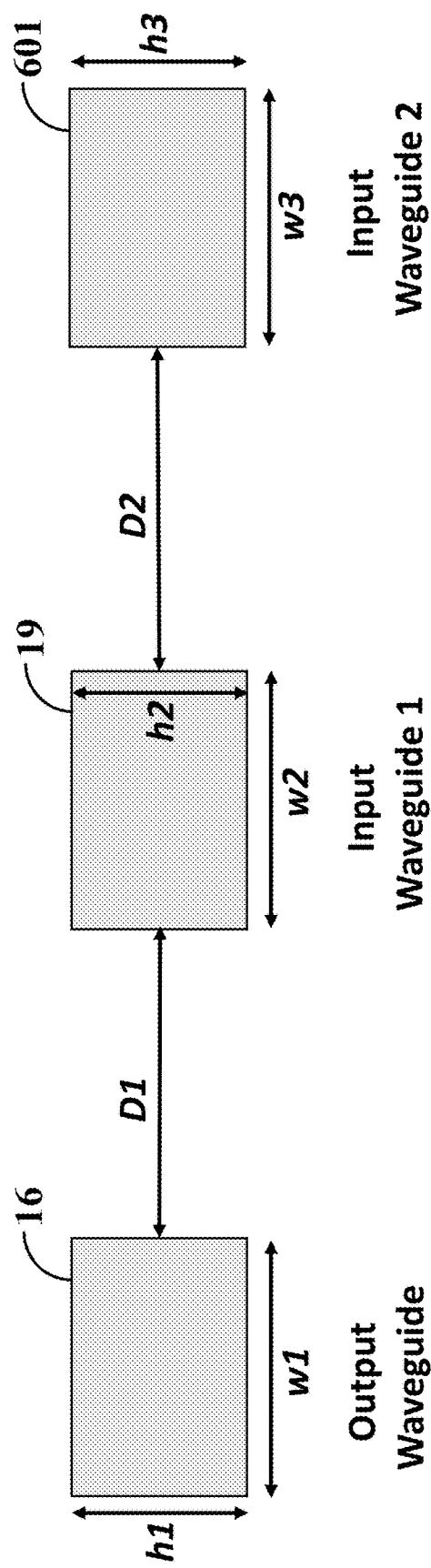
FIG. 10 shows a cross-sectional view of a plurality of waveguides associated with the imaging devices of FIG. 6 or 9 in accordance with various embodiments described herein.

FIG. 10 shows a schematic illustration of a cross-sectional view of the output waveguide 16, the first input waveguide 19 and the second input waveguide 601 spaced apart with varying gaps as described earlier with respect to FIGS. 6 and 9. The cross-sectional view of FIG. 10 may be associated with cross-sections of FIGS. 6 and 9 as shown along the dotted lines 650 and 750, respectively. Each waveguide may be characterized by a height (e.g., h1, h2, and h3) and a width (e.g., w1, w2, and w3), wherein the height may vary between 200 nm and 5 μm and the width may vary between 200 nm and 5 μm. In some embodiments, the first input waveguide 19 may be positioned at the predetermined distance D1 away from the output waveguide 16. The second input waveguide 601 may be positioned at the predetermined distance D2 away from the input waveguide 19 and a total distance of (D1+D2+w2) away from the output waveguide 16. In some embodiments, D1 may approximately equal D2. The spacing between the output waveguide 16 and a closest input waveguide may vary between approximately 50 nm and 10 μm. The spacing between the input waveguides (e.g., the first input waveguide and the second input waveguide) may vary between approximately 50 nm and 10 μm.

Figure 11:
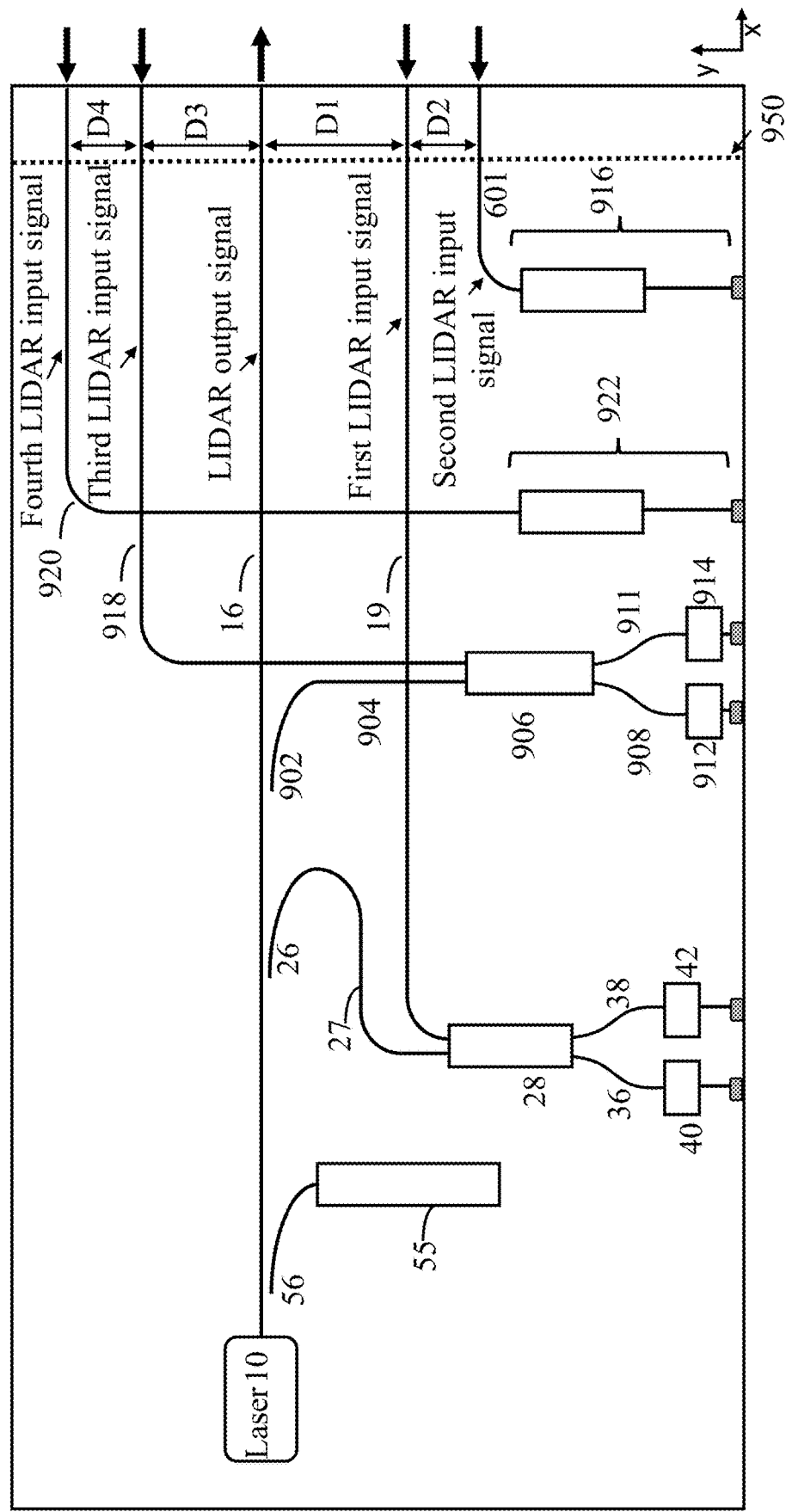
FIG. 11 shows an imaging device with walk-off compensation in accordance with various embodiments described herein.

FIG. 11 shows a schematic illustration of a LIDAR chip configured to mitigate walk-off associated with bi-directional scanning modules. Such bi-directional scanning modules may be associated with scanning systems in which one or more mirrors rotate about an axis (e.g., the fast-axis and the slow-axis) in two different directions. For example, the bi-directional scanning modules may cause mechanical rotation of the one or more mirrors about the fast-axis and the slow-axis resulting in the returning LIDAR signals being directed above and/or below the output waveguide facet.

In order to mitigate the bi-directional walk-off effect, the LIDAR chip of FIG. 11 may include additional input waveguides, such as a third input waveguide 918 and a fourth input waveguide 920, positioned above the output waveguide 16 and in addition to the first and the second input waveguides 19 and 601 of FIGS. 6, 9, and 10 that can be positioned below the output waveguide 16.

As described earlier with respect to FIG. 6, each input waveguide may be spaced apart from one another and positioned away from the output waveguide based on the range of operation (e.g., short-range <10 m, mid-range 10 m up to 50 m, and long-range >50 m), the wavelength range of operation (e.g., 1200 nm to 1320 nm, 1400 nm to 1590 nm, and 1900 to 2100 nm), the chirp duration, the chirp rate, the scanning module 106 parameters, specifications of the lens and/or collimators used to focus the optical signals (e.g., the LIDAR output signal, the first LIDAR input signal, and the second LIDAR input signal) to-and-from the LIDAR chip.

The third input waveguide 918 may couple the incoming third LIDAR input signal to a light combining component 906, wherein the incoming signal undergoes interference with a reference signal consisting of a portion of the LIDAR output signal. The light combining component 906 may then generate two optical output signals via detector waveguides 908 and 911 that carry the output signals to light sensors 912 and 914, respectively. The light sensors 912 and 914 may be arranged in a BPD configuration as described earlier with respect to at least one of FIGS. 2, 3, 7, and 8.

Each of the elements 916 and 922 may consist of an arrangement of components (not shown) including a light combining component, a pair of detector waveguides, and a pair of BPDs, such as those described earlier with respect to FIGS. 2, 3, 6, 7, 8, and 9. Each of the elements 916 and 922 may be configured to receive two input signals and output two optical signals. For example, element 916 can be configured to receive the second LIDAR input signal, via the second input waveguide 601, and a reference signal that may comprise a portion of the LIDAR output signal coupled via a splitter from the output waveguide 16. As another example, element 922 can be configured to receive the fourth LIDAR input signal, via fourth input waveguide 920, and a reference signal via a splitter from the output waveguide 16. The electrical signals generated by each light sensor 40, 42, 912, and 914 may interface with TIAs and/or ADCs as described earlier with respect to FIGS. 2, 3, 6, 7, 8, and 9. The control unit 104 may then process the signals generated by the ADCs to determine LIDAR data corresponding to the one or more objects within the FOV of the system. The LIDAR data may include depth, velocity, and/or reflectivity information associated with each data point. The LIDAR system can then generate a 3D point-cloud based image construction of the scanned FOV from the LIDAR data.

As described earlier with respect to FIG. 9, the LIDAR chip may be configured to provide polarization separation of the incoming LIDAR signals. In some embodiments, the LIDAR chip of FIG. 11 may be configured to include a PSR along a propagation path of each input signal as described earlier to FIG. 9. In some other embodiments, the LIDAR chip of FIG. 9 may be configured to include an on-chip OPA for providing the polarization separation and a polarization rotator along each input waveguide. In alternative embodiments, the LIDAR system of FIG. 11 may include the birefringent crystal off-chip for providing the polarization separation and a polarization rotation along each input waveguide in place of the PSRs.

Figure 12:
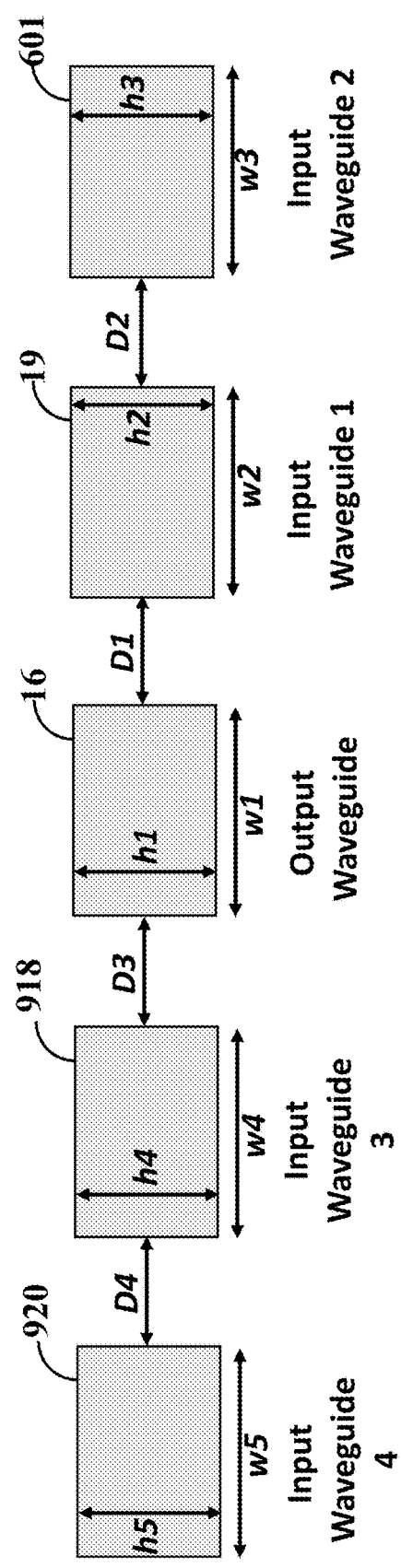
FIG. 12 shows a cross-sectional view of a plurality of waveguides for the imaging device of FIG. 9 in accordance with various embodiments described herein.

FIG. 12 shows a schematic illustration of a cross-sectional view of the multiple input waveguides (e.g., 19, 601, 918, and 920) and the output waveguide 16 of FIG. 11. The cross-sectional view of FIG. 12 may be associated with a cross-section shown along the dotted line 950 of FIG. 11. Each waveguide may be characterized by a height (e.g., h1, h2, h3, h4, and h5) and a width (e.g., w1, w2, w3, w4, and w5), wherein the height may vary between 200 nm and 5 μm and the width may vary between 200 nm and 5 μm. The output waveguide 16, the first input waveguide 19, the second input waveguide 601, the third input waveguide 918, and the fourth input waveguide 920 may be spaced apart with varying gaps. For example, the first input waveguide 19 may be positioned at a distance D1 away from the output waveguide 16. The second input waveguide 601 may be positioned at a distance D2 away from the input waveguide 19 and a total distance of (D1+D2+w2) away from the output waveguide 16. The third input waveguide 918 may be positioned at distance D3 away from the output waveguide 16 and the fourth input waveguide 920 may be positioned at distance D4 away from the input waveguide 3 and a total distance of (D4+D3+w4) away from the output waveguide 16.

In some embodiments, D1 may approximately equal D2, D3, and D4. As described earlier with respect to FIG. 10, the spacing between the output waveguide 16 and a closest input waveguide may vary between approximately 50 nm and 10 μm. The spacing between the input waveguides (e.g., the first and the second input waveguide, the third and the fourth input waveguide) may vary between approximately 50 nm and 10 μm.

As described earlier with respect to FIG. 6, determination of each of the predetermined distances (D1, D2, D3, and D4) may be based on the walk-off mitigation parameter. As described earlier, the walk-off mitigation parameter may be based on various parameters such as the FOV, the fast-axis speed, the slow-axis speed, the range of operation, the wavelength of operation, the chirp bandwidth, the chirp frequencies, and/or the chirp duration. The walk-off mitigation parameter may further be based on the optics (e.g., collimators, lenses, etc.) used in the imaging system (e.g., LIDAR system) and/or the waveguide coupling coefficient.

Figure 13:
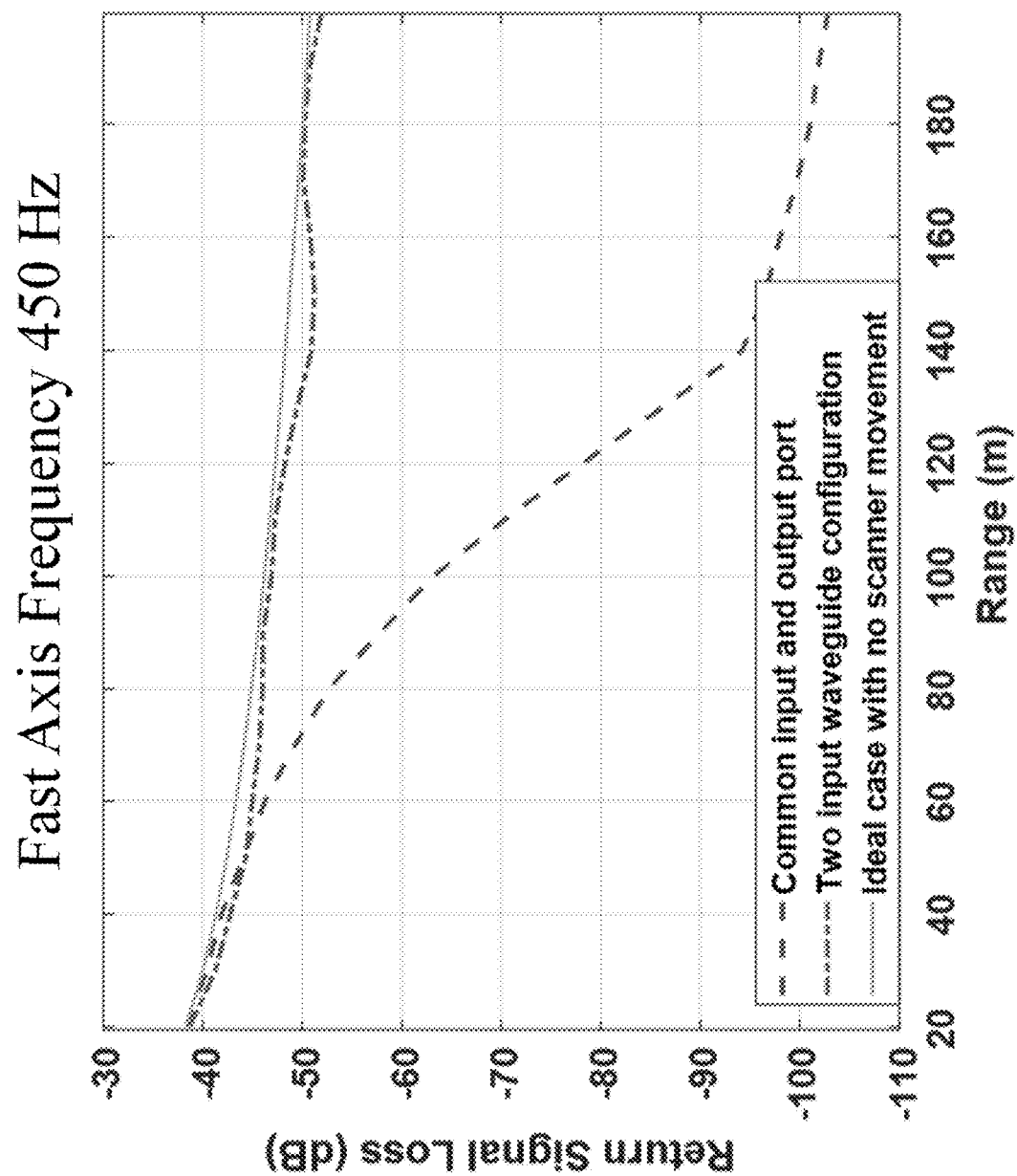
FIG. 13 shows a plot of average coupling efficiency versus range of operation with and without walk-off compensation in accordance with various embodiments described herein.

FIG. 13 shows a plot of channel loss versus a range of detection for a LIDAR system with and without walk-off mitigation at a scan rate of approximately 450 Hz for the fast-axis mirror. The black curve shows a simulated channel loss for a LIDAR system in which the scanning module is assumed to cause no offset in the returning LIDAR signals from an expected port of entry of the LIDAR chip. The curve representative of the channel loss for the same port of exit and entry (e.g., port 206 of circulator 218) for the LIDAR signals (e.g., the LIDAR output signal and the first LIDAR input signal) shows increasing channel loss with an increase in the range of detection of the LIDAR system. The curve representative of the channel loss for the two-input waveguide configuration, as described earlier with respect to FIG. 6, shows that channel loss is greatly mitigated for over an extended range of operation. In some embodiments, the spacing between the output waveguide and the first input waveguide may be approximately 1.5 μm and the spacing between the first input waveguide and the second input waveguide may be approximately 2 μm.

Figure 14:
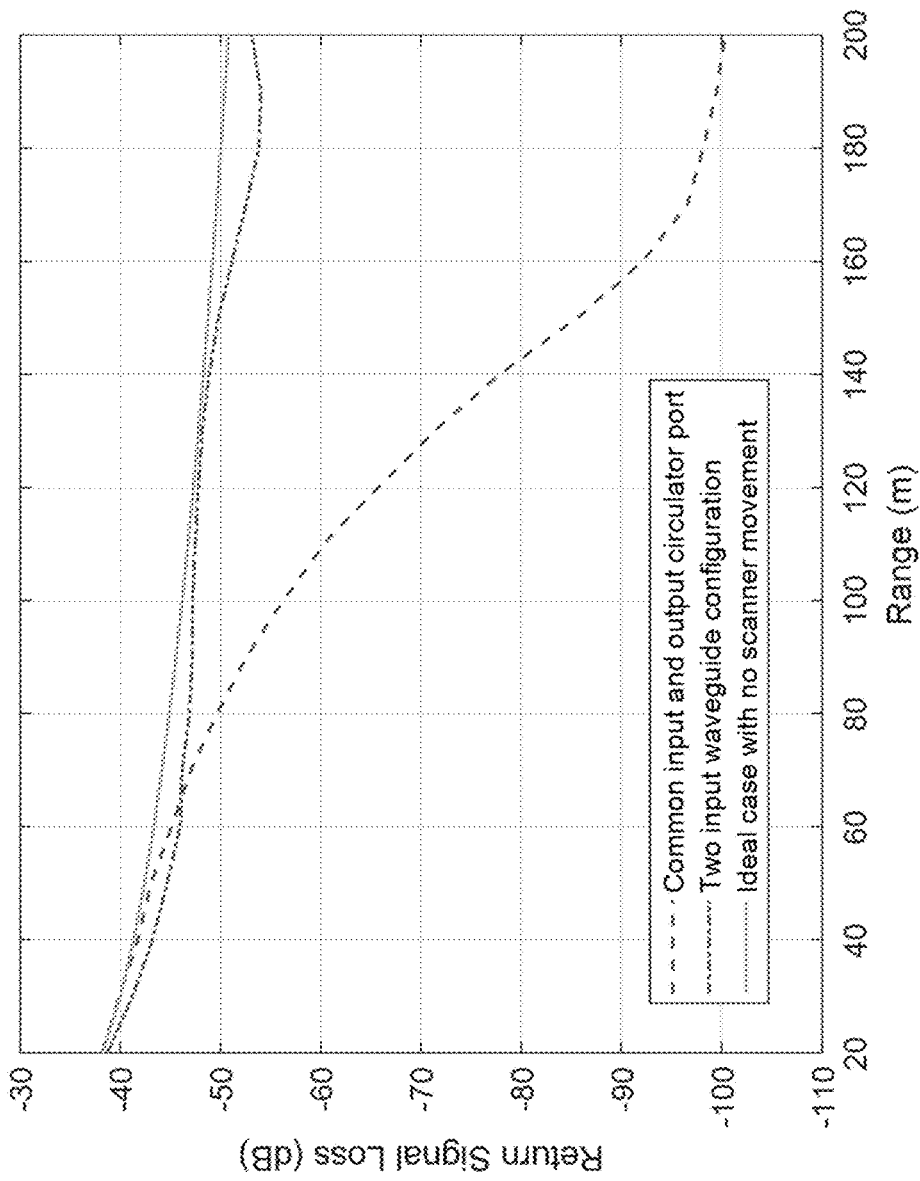
FIG. 14 shows a plot of average coupling efficiency versus range of operation with and without walk-off compensation at a higher scan speed in accordance with various embodiments described herein.

FIG. 14 shows a plot of channel loss versus a range of detection for a LIDAR system with and without walk-off mitigation at a scan rate of approximately 700 Hz for the fast-axis mirror. The black curve shows a simulated channel loss for a LIDAR system in which the scanning module is assumed to cause no offset in the returning LIDAR signals from an expected port of entry of the LIDAR chip. The curve representative of the channel loss for the same port of exit and entry (e.g., port 206 of circulator 218) for the LIDAR signals (e.g., the LIDAR output signal and the first LIDAR input signal) shows increasing channel loss with an increase in the range of detection of the LIDAR system. The curve representative of the channel loss for the two-input waveguide configuration, as described earlier with respect to FIG. 6, shows that channel loss is greatly mitigated for over an extended range of operation and for high fast-axis scan rates of approximately 700 Hz. In some embodiments, the spacing between the output waveguide and the first input waveguide may be approximately 1.5 μm and the spacing between the first input waveguide and the second input waveguide may be approximately 2 μm.

While the simulation results demonstrate the advantages of the walk-off mitigation via the two-input waveguide configuration of FIG. 6, similar results can be achieved via the four-input waveguide configuration of FIG. 11. Although the embodiments of FIGS. 6, 9, and 11 show a two-input and a four-input waveguide configuration, the LIDAR system may comprise of any number of input waveguides for improving an efficiency of collecting later arriving photons reflected from objects located further away and/or offset away from a first input facet located closest to the output waveguide facet due to fast rotation of the one or more mirrors of the scanning module 106. For example, systems may include more than two input waveguides on either side of the output waveguide. This configuration may be suitable for MEMS based scanners. As another example, systems may include more than two input waveguides on only one side of the output waveguide. This configuration may be suitable for polygon scanners that rotate in one direction. The electronics and processing circuitry for such multiple input waveguide configurations may be as described earlier in FIGS. 7 and 8.

The four-input waveguide configuration of FIG. 11 may be further modified to provide polarization separation of the multiple incoming LIDAR signals by incorporating PSRs, OPAs, birefringent crystals, and/or polarization rotators as described earlier with respect to FIG. 9.

The point-cloud image generated by the system may further be overlaid on two-dimensional images of the scanned FOV acquired by one or more image acquisition devices (e.g., camera). The three-dimensional image construction may be displayed by one or more user devices and/or graphical user interfaces in communication with the system.

Although the processing system is disclosed in the context of a LIDAR system, the processing system can be used in other applications such as machine learning, data analytics, autonomous vehicle technology, remote sensing, machine vision, and imaging.

The above-described example embodiments may be recorded in non-transitory computer-readable media including program instructions to implement various operations embodied by a processing system. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer readable media may also be a distributed network, so that the program instructions are stored and executed in a distributed fashion. The program instructions may be executed by one or more processors or computational elements. The non-transitory computer readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

The invention claimed is:

1. A method for remote imaging, comprising:
generating, by a Light Detection and Ranging (LIDAR) chip and via an output waveguide, a LIDAR output signal;
receiving, by the LIDAR chip and via a plurality of input waveguides, a plurality of LIDAR input signals respectively associated with the plurality of input waveguides, wherein a terminating facet associated with each of the plurality of input waveguides is spaced apart from another terminating facet associated with another one of the plurality of input waveguides based on a predetermined walk-off mitigating factor,
a first terminating facet of a first one of the input waveguides being positioned between 50 nm and 10 μm away from a second terminating facet of a second one of the input waveguides; and
generating, by the LIDAR chip and based on the plurality of LIDAR input signals, a plurality of electrical signals.

2. The method of claim 1, wherein the LIDAR output signal comprises a frequency modulated continuous wavelength (FMCW) optical signal.

3. The method of claim 1, wherein the LIDAR output signal is associated with a varying wavelength range between 1290 nm and 1310 nm or 1540 nm and 1560 nm.

4. The method of claim 1, wherein the first input waveguide and the second input waveguide are positioned next to each other.

5. The method of claim 1, wherein the predetermined walk-off mitigating factor is based on at least one of a range of operation, a chirp bandwidth, a chirp rate, and laser specifications associated with the LIDAR chip.

6. The method of claim 1, further comprising:
prior to the generating the plurality of electrical signals, generating, by the LIDAR chip, a transverse electric (TE) polarized optical signal and a transverse magnetic (TM) polarized optical signal for each of the plurality of LIDAR input signals.

7. A remote imaging system, comprising:
at least one Light Detection and Ranging (LIDAR) chip configured to:
receive, via an output waveguide, a LIDAR output signal;
receive, via a plurality of input waveguides, a plurality of LIDAR input signals respectively associated with the plurality of input waveguides, wherein a terminating facet associated with each of the plurality of input waveguides is spaced apart from another terminating facet associated with another one of the plurality of input waveguides based on a predetermined walk-off mitigating factor,
a first terminating facet of a first one of the input waveguides being positioned between 50 nm and 10 μm away from a second terminating facet of a second one of the input waveguides; and
generate, based on the plurality of LIDAR input signals, a plurality of electrical signals; and
a scanning module configured to:
direct the plurality of LIDAR input signals to at least one facet associated with one of the plurality of input waveguides.

8. The system of claim 7, wherein the predetermined walk-off mitigating factor is based on at least one of a scan rate of the scanning module and a field-of-view associated with the scanning module.

9. The system of claim 8, wherein the predetermined walk-off mitigating factor is further based on a range of operation of the remote imaging system.

10. The system of claim 7, wherein the LIDAR output signal comprises a frequency modulated continuous wavelength (FMCW) optical signal.

11. The system of claim 7, wherein the LIDAR output signal is associated with a varying wavelength range between 1290 nm and 1310 nm or 1540 nm and 1560 nm.

12. The system of claim 7, wherein the first input waveguide and the second input waveguide are positioned next to each other.

13. The system of claim 7, further comprising:
a computing system configured to:
receive, from the LIDAR chip, the plurality of electrical signals; and
generate, based on the plurality of electrical signals, LIDAR data associated with a scanned field-of-view.

14. The system of claim 13, further comprising:
a display device configured to:
  receive the LIDAR data; and
  cause display of a point-cloud image based on the received the LIDAR data, wherein the point-cloud image comprises depth and velocity information.

15. The system of claim 7, wherein the LIDAR chip is further configured to:
generate a transverse electric (TE) polarized optical signal and a transverse magnetic (TM) polarized optical signal for each of the plurality of LIDAR input signals prior to the generating the plurality of electrical signals.

16. A remote imaging system, comprising:
at least one Light Detection and Ranging (LIDAR) chip, wherein the LIDAR chip comprises:
  a single output waveguide configured to generate a LIDAR output signal from an output waveguide facet located at an edge of the LIDAR chip;
  a first input waveguide configured to receive a first LIDAR input signal via a first input facet located at the edge of the LIDAR chip; and
  a second input waveguide configured to receive a second LIDAR input signal via a second input facet located at the edge of the LIDAR chip, wherein a termination of the second input waveguide at the second input facet is positioned between 50 nm and 10 µm away from a termination of the first input waveguide at the first input facet; and
a scanning module configured to:
  direct the first LIDAR input signal onto the first input facet; and
  direct the second LIDAR input signal onto the second input facet.

17. The system of claim 16, wherein the at least one LIDAR chip further comprises:
a polarization splitter and rotator (PSR) configured to:
  receive the first LIDAR input signal; and
  generate a transverse electric (TE) component and a transverse magnetic component associated with the first LIDAR input signal.

18. The system of claim 17, wherein the at least one LIDAR chip further comprises:
a light combining component configured to generate a beat signal based on the TE component associated with the first LIDAR input signal, wherein the beat signal is indicative of a distance and velocity of a reflecting object associated with the first LIDAR input signal.

\* \* \* \* \*